United States Patent
Kanno et al.

(10) Patent No.: US 10,344,531 B2
(45) Date of Patent: Jul. 9, 2019

(54) DAYLIGHTING SLAT AND DAYLIGHTING DEVICE

(71) Applicant: SHARP KABUSHIKI KAISHA, Sakai, Osaka (JP)

(72) Inventors: Toru Kanno, Sakai (JP); Shumpei Nishinaka, Sakai (JP); Daisuke Shinozaki, Sakai (JP); Shun Ueki, Sakai (JP); Tsuyoshi Kamada, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/569,668

(22) PCT Filed: Apr. 26, 2016

(86) PCT No.: PCT/JP2016/063045
§ 371 (c)(1),
(2) Date: Oct. 26, 2017

(87) PCT Pub. No.: WO2016/175203
PCT Pub. Date: Mar. 11, 2016

(65) Prior Publication Data
US 2018/0119486 A1 May 3, 2018

(30) Foreign Application Priority Data

Apr. 30, 2015 (JP) .................................. 2015-092920

(51) Int. Cl.
*E06B 9/386* (2006.01)
*F21S 11/00* (2006.01)
(Continued)

(52) U.S. Cl.
CPC ................ *E06B 9/386* (2013.01); *E06B 5/00* (2013.01); *F21S 11/00* (2013.01); *F21S 11/007* (2013.01);
(Continued)

(58) Field of Classification Search
CPC ...................................................... F21S 11/007
(Continued)

(56) References Cited

U.S. PATENT DOCUMENTS

| 4,773,733 A | 9/1988 | Murphy, Jr. et al. |
| 6,196,292 B1 | 3/2001 | Jackson |

(Continued)

FOREIGN PATENT DOCUMENTS

| CN | 1392959 A | 1/2003 |
| JP | 63-040494 U | 3/1988 |

(Continued)

OTHER PUBLICATIONS

International Search Report; dated Aug. 2, 2016; PCT/JP2016/063045; PCT.
(Continued)

*Primary Examiner* — Christopher E Mahoney
(74) *Attorney, Agent, or Firm* — ScienBiziP, P.C.

(57) ABSTRACT

A daylighting slat (40) includes a daylighting plate (40) extending in one direction. The daylighting plate (40) includes: a transparent base material (41) having a curved or angled shape in a cross-section taken perpendicular to a lengthwise direction of the daylighting plate (40); a plurality of transparent daylighting sections (42) at least in a first region (41Aa) of a first face (41A) of the base material (41); and gap portions between the daylighting sections (42), wherein each of the daylighting sections (42) has a side face in contact with one of the gap portions, a part of the side face
(Continued)

serving as a reflection face where light incident to that daylighting section (42) is reflected.

16 Claims, 30 Drawing Sheets

(51) Int. Cl.
  *E06B 5/00* (2006.01)
  *G02B 5/02* (2006.01)
  *E06B 9/24* (2006.01)

(52) U.S. Cl.
  CPC ......... *G02B 5/0257* (2013.01); *G02B 5/0278* (2013.01); *E06B 2009/2405* (2013.01); *E06B 2009/2417* (2013.01)

(58) Field of Classification Search
  USPC .......................................................... 359/596
  See application file for complete search history.

(56) References Cited

U.S. PATENT DOCUMENTS

| | | | |
|---|---|---|---|
| 6,966,673 | B1 | 11/2005 | Oyama |
| 9,810,389 | B2* | 11/2017 | Nango .................. F21S 11/007 |
| 9,817,161 | B2 | 11/2017 | Hao et al. |
| 2008/0291541 | A1 | 11/2008 | Padiyath et al. |
| 2011/0043919 | A1 | 2/2011 | Ko et al. |
| 2011/0259529 | A1 | 10/2011 | Clear |
| 2014/0016191 | A1 | 1/2014 | Yeh et al. |
| 2014/0104689 | A1 | 4/2014 | Padiyath et al. |
| 2014/0198390 | A1 | 7/2014 | Padiyath et al. |
| 2015/0129140 | A1 | 5/2015 | Dean et al. |
| 2015/0226394 | A1* | 8/2015 | Ueki ....................... E06B 9/386 359/595 |
| 2016/0025288 | A1* | 1/2016 | Vasylyev ................. F21V 3/06 359/595 |
| 2016/0060954 | A1* | 3/2016 | Nishida ...................... E06B 9/32 160/176.1 R |
| 2016/0069524 | A1 | 3/2016 | Dai et al. |
| 2016/0178164 | A1* | 6/2016 | Nishida ................... E06B 9/303 359/596 |
| 2016/0186949 | A1 | 6/2016 | Sekido et al. |
| 2016/0223155 | A1 | 8/2016 | Nango et al. |
| 2016/0252225 | A1 | 9/2016 | Tsujimoto et al. |
| 2017/0138124 | A1* | 5/2017 | Kanno .................... E06B 9/386 |
| 2017/0146207 | A1 | 5/2017 | Nishinaka et al. |
| 2017/0299135 | A1 | 10/2017 | Sekido et al. |
| 2017/0314752 | A1 | 11/2017 | Yui et al. |

FOREIGN PATENT DOCUMENTS

| | | |
|---|---|---|
| JP | 2695545 B2 | 12/1997 |
| JP | 2001-003661 A | 1/2001 |
| JP | 2002-270015 A | 9/2002 |
| JP | 3120889 U | 3/2006 |
| JP | 2010-067565 A | 3/2010 |
| JP | 2013-002224 A | 1/2013 |
| JP | 2013-014909 A | 1/2013 |
| JP | 2013-156554 A | 8/2013 |
| JP | 2014-015831 A | 1/2014 |
| JP | 2015-001083 A | 1/2015 |
| WO | 2014/189061 A1 | 11/2014 |
| WO | 2014/200113 A1 | 12/2014 |
| WO | 2015/046336 A1 | 4/2015 |
| WO | 2015/056736 A1 | 4/2015 |
| WO | 2015/076245 A1 | 5/2015 |
| WO | 2015/174397 A1 | 11/2015 |
| WO | WO2016002869 * | 1/2016 ............... E06B 5/00 |

OTHER PUBLICATIONS

Non-final Rejection dated Apr. 6, 2018 in U.S. Appl. No. 15/569,732.
Final Rejection dated Sep. 10, 2018 in U.S. Appl. No. 15/569,732.
Advisory Action dated Jan. 4, 2019 in U.S. Appl. No. 15/569,732.
International Search Report dated Aug. 2, 2016 in PCT International Application No. PCT/JP2016/063053.
Office Action dated Feb. 7, 2019 in U.S. Appl. No. 15/569,732.

* cited by examiner

DAYLIGHTING SLAT AND DAYLIGHTING DEVICE

TECHNICAL FIELD

The present invention relates to daylighting slats and daylighting devices. The present application claims priority to Japanese Patent Application, Tokugan, No. 2015-092920 filed in Japan on Apr. 30, 2015, the entire contents of which are incorporated herein by reference.

BACKGROUND ART

Occupants of a building, such as those of an office room, sometimes experience uncomfortable glare because natural outdoor light (sunlight) enters inside (the interior of the room) through, for example, a window pane (window glass). A window shade (window blind), a curtain, or the like may therefore be used over the window pane to prevent the occupants from experiencing glare during work and also out of privacy and security concerns. The use of these window coverings restricts light coming through the window pane and prevents people from peeping inside through the window pane.

Some window shades (for example, those described in Patent Literature 1) include slats each of which is composed of a first flat plate section and a second flat plate section at a predetermined angle and hence has an inverted V-shaped cross-section, in order to enhance the light-blocking function of the window shades. In this structure, the first flat plate section of each slat overlaps the first flat plate section of the slat that is immediately below that slat. The first flat plate sections can therefore cover the whole window, which enhances the light-blocking function thereof.

Efforts have also been made to impart various functions other than the light-blocking function to the window shade. For example, tiny structures are formed on the slats (daylighting members) of a window shade to efficiently admit outdoor light during the daytime for projection of light in the direction of, for example, an indoor ceiling (see, for example, Patent Literature 2).

Patent Literature 2 discloses an assembly, attached to a slat via a support mount, that includes a light-guiding film sandwiched between a planar color-changing element and a planar shading element. In this structure, the support mount holding the planar assembly pivots to control its light-blocking and light-transmitting functions.

CITATION LIST

Patent Literature

Patent Literature 1: Japanese Patent No. 2695545
Patent Literature 2: Japanese Unexamined Patent Application Publication, Tokukai, No. 2014-15831

SUMMARY OF INVENTION

Technical Problem

As described above, there is prior art where tiny structures are formed on slats (daylighting members) to efficiently admit outdoor light during the daytime. If the shape of the tiny structures on the daylighting member and the orientation of the tiny structures during the daylighting operation are not properly controlled, however, the resultant daylighting properties are unsatisfactory. Prior art has other issues as well.

As an example, the slats described in Patent Literature 1 only enhance light-blocking properties. Patent Literature 1 neither discloses nor suggests anything about daylighting properties.

As another example, all the slats described in Patent Literature 2 have a platelike shape. Therefore, when the window shade is closed, the slats overlap each other and thereby incline. Hence, if the daylighting member is to be installed in such a manner that the tiny structures thereof become parallel to the window, the resultant daylighting properties are unsatisfactory.

Conceived in view of these conventional problems, the present invention, in one aspect thereof, has an object to provide a daylighting device with slats capable of achieving maximum intended daylighting properties and to provide a daylighting slat suitably used in such a daylighting device.

Solution to Problem

The present invention in an aspect thereof is directed to a daylighting slat including a daylighting plate extending in one direction, the daylighting plate including: a transparent base material having a curved or angled shape in a cross-section taken perpendicular to a lengthwise direction of the daylighting plate; a plurality of transparent daylighting sections at least in a first region of a first face of the base material; and gap portions between the daylighting sections, wherein each of the daylighting sections has a side face in contact with one of the gap portions, a part of the side face serving as a reflection face where light incident to that daylighting section is reflected.

In a daylighting slat in accordance with another aspect of the present invention, the daylighting sections may be disposed on a face of a film attached to the first face of the base material.

A daylighting slat in accordance with yet another aspect of the present invention may further include a support member configured to support the daylighting plate.

In a daylighting slat in accordance with still another aspect of the present invention, the daylighting sections may include a plurality of first daylighting sections and a plurality of second daylighting sections; the first daylighting sections may be disposed in the first region; the second daylighting sections may be disposed on one of faces of a second portion that is curved or angled with respect to the first region of the base material; and the first daylighting sections may have a different shape from that of the second daylighting sections, in respective cross-sections taken perpendicular to lengthwise directions thereof.

A daylighting slat in accordance with yet still another aspect of the present invention may further include a light-diffusion layer on a second face of the base material.

In a daylighting slat in accordance with a further aspect of the present invention, the base material may be bent along a centerline thereof that is parallel to a lengthwise direction of the base material.

In a daylighting slat in accordance with yet a further aspect of the present invention, the base material may be bent along a straight line that is parallel to a lengthwise direction of the base material and offset from a centerline thereof; and the daylighting sections may be disposed in the first region, where the first region is one of two parts into which the first face of the base material is divided by the straight line, that particular one of the two parts being larger in area than the other part.

In a daylighting slat in accordance with still a further aspect of the present invention, the second portion of the base material may be light-absorbing.

In a daylighting slat in accordance with yet still a further aspect of the present invention, the second portion of the base material may be light-reflecting.

The present invention in an additional aspect thereof is directed to a daylighting device including: a plurality of slats; and a support mechanism configured to connect the slats so that the slats have a lengthwise direction thereof in a horizontal direction and also to support the slats so that the slats hang down in a vertical direction, wherein at least one of the slats includes the daylighting slat described above.

In a daylighting device in accordance with another aspect of the present invention, the support mechanism may be configured to support the slats so that the slats can move up and down.

In a daylighting device in accordance with yet another aspect of the present invention, the support mechanism may be configured to support the slats so that the slats can be tilted in a controlled manner.

In a daylighting device in accordance with still another aspect of the present invention, at least one of those slats Which are in a vertically higher portion may include the daylighting slat; and at least one of those slats which are in a vertically lower portion may include a shading slat.

In a daylighting device in accordance with yet still another aspect of the present invention, the daylighting slat may have a shape identical to that of the shading slat, in respective cross-sections taken perpendicular to the lengthwise directions thereof.

In a daylighting device in accordance with a further aspect of the present invention, at least two of the slats may each include the daylighting slat; and in at least one of the daylighting slats, the daylighting sections may have different shapes, Advantageous Effects of Invention From the foregoing description, the present invention, in one aspect thereof, can provide a daylighting device capable of efficiently admitting natural outdoor light (sunlight) into a room and illuminating brightly deep into the room without having to cause occupants of the room to experience glare and also provide a daylighting slat suitably used in such a daylighting device.

DESCRIPTION OF EMBODIMENTS

Figure 1:
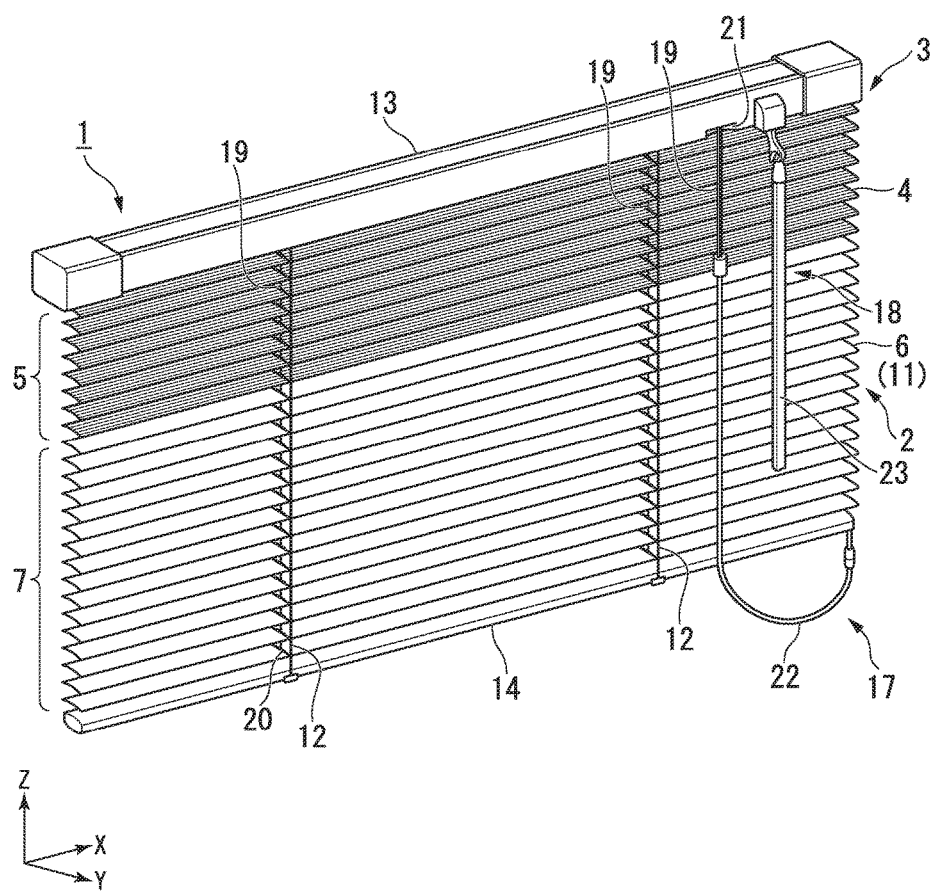
FIG. 1 is a perspective view of an outer appearance of a daylighting device.

The following will describe embodiments of the present invention in reference to drawings.

In the drawings used in the following description, members are drawn to suitable arbitrary scales to show them with readily recognizable dimensions.

First Embodiment

First of all, a daylighting device 1 shown, for example, in FIG. 1 will be described as a first embodiment of the present invention.

FIG. 1 is a perspective view of an outer appearance of the daylighting device 1. Throughout the following description, the directional designations such as "upper," "lower," "top," "bottom," "left," "right," "front," and "back" in and around the daylighting device 1 are given as they would be in and around the daylighting device 1 installed for actual use. Unless otherwise specified, these designations match those in and around the daylighting device 1 on the pages on which drawings are drawn.

In FIG. 1, the Z direction runs from top to bottom or vice versa of the daylighting device 1, the X direction from left to right or vice versa, and the Y direction from front to back or vice versa.

The daylighting device 1, as shown in FIG. 1, is primarily composed of: a plurality of slats 2 arranged horizontally (X direction) and parallel to each other at intervals; and a support mechanism 3 that supports the slats 2 so that the slats 2 can be freely hung down in the vertical direction (Z direction). In the daylighting device 1, the slats 2 are supported in such a manner as to be moved up and down freely and also as to be tilted freely.

The slats 2 constitute: a daylighting area 5 delineated by a plurality of daylighting slats 4 having a daylighting capability; and a shading area 7 delineated below the daylighting area 5 by a plurality of shading slats 6 having a light-blocking capability. Throughout the following description, the daylighting slats 4 and the shading slats 6 will be collectively referred to as the slats 2 when there is no particular need to distinguish between them.

The daylighting slats 4, delineating the daylighting area 5, each include a daylighting plate 40 extending in one direction.

Figure 2:
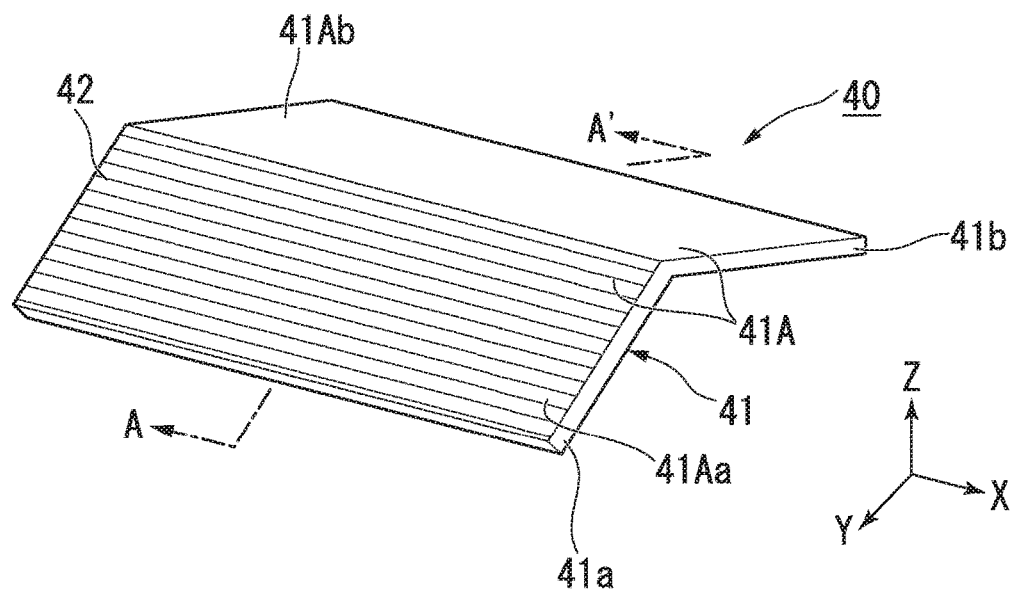
FIG. 2 is a schematic perspective view of a structure of a daylighting

FIG. 2 is a schematic perspective view of a structure of the daylighting plate.

Figure 3:
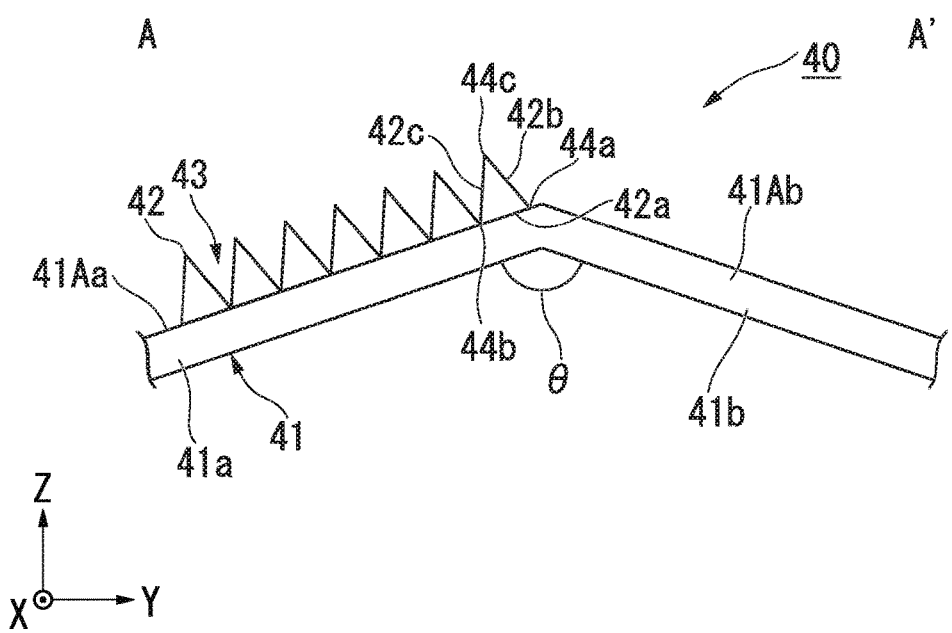
FIG. 3 is an enlarged view of a part of a cross-section taken along line A-A' in FIG. 2.

FIG. 3 is an enlarged view of a part of a cross-section taken along line A-A' in FIG. 2.

Referring to FIGS. 2 and 3, the daylighting plate 40 includes: a base material 41 that has a curved or angled shape in a cross-sectional view (A-A' plane) taken perpendicular to the lengthwise direction of the daylighting plate 40; a plurality of transparent daylighting sections 42 at least in a first region 41Aa of a first face 41A of the base material 41; and a plurality of gap portions 43 between the daylighting sections 42.

The base material 41 is curved or angled in a cross-sectional view taken perpendicular to the lengthwise direction thereof. In FIG. 2, the base material 41 includes a first portion 41 a having the first region 41Aa in a first face 41A and a second portion 41 b having a second region 41Ab in the first face 41A. At the boundary of the first portion 41 a and the second portion 41b, the base material 41 is bent along a centerline thereof that is parallel to the lengthwise direction thereof. The first portion 41 a and the second portion 41 b, constituting the base material 41, make therebetween an angle θ of a magnitude that is specified appropriately in accordance with the shape of the daylighting sections 42 formed in the first region 41Aa.

In the first region 41Aa of the first portion 41a are disposed the daylighting sections 42. The portion of the angled base material 41 where the daylighting sections 42 are disposed is termed the first portion 41a, and the portion of the angled base material 41 where no daylighting sections 42 are disposed is termed the second portion. The first region 41Aa of the first portion 41a is preferably flat.

The base material 41 is composed of thermoplastic polymer, thermosetting resin, photopolymerizable resin, or another transparent resin. Examples of such transparent resins include acrylic-based polymers, olefin-based polymers, vinyl-based polymers, cellulose-based polymers, amide-based polymers, fluorine-based polymers, urethane-based polymers, silicone-based polymers, and imide-based polymers.

Especially preferred among these are, for example, polymethyl methacrylate resin (PMMA), triacetyl cellulose (TAC), polyethylene terephthalate (PET), cycloolefin polymer (COP), polycarbonate (PC), polyethylene naphthalate (PEN), polyether sulfone (PES), and polyimide (PI). The base material 41 preferably has a total light transmittance of 90% or greater when measured as instructed in JIS K7361-1, which gives sufficient transparency.

The daylighting sections 42 are composed of, for example, acrylic resin, epoxy resin, silicone resin, or another transparent photosensitive organic material, To these organic materials, a polymerization initiator, a coupling agent, a monomer, and/or an organic solvent may be added for use. Furthermore, the polymerization initiator may contain various additives including photopolymerizable monomers such as a stabilizer, an inhibitor, a plasticizer, a fluorescent whitening agent, a releasing agent, and a chain transfer agent. Those materials specified in Japanese Patent No. 4129991 may also be used.

The daylighting sections 42 preferably have a total light transmittance of 90% or greater when measured as instructed in JIS K7361-1, which gives sufficient transparency.

The daylighting sections 42 extend in the lengthwise direction of the base material 41 (X direction) and arranged next to each other in the widthwise direction of the base material 41 (Y direction), Each daylighting section 42 forms a prismatic member with a triangular cross-sectional shape. More specifically, the daylighting section 42 has: a first face portion 42a that faces the first region 41Aa of the first face 41a of the base material 41; a second face portion 42b that adjoins the first face portion 42a with a first corner portion 44a intervening therebetween; and a third face portion (reflection face, side face) 42c that adjoins the first face portion 42a with a second corner portion 44b opposite the first corner portion 44a intervening therebetween and that also adjoins the second face portion 42b with a third corner portion 44c intervening therebetween.

Because there exists air (the gap portions 43) between the daylighting sections 42. The second face portions 42b and the third face portions 42c form an interface between the air and the substance that constitutes the daylighting sections 42. The gap portions 43 may be filled with another low-refractive-index material. However, the refractive index difference at the interface of the inside and outside of the daylighting sections 42 is a maximum when there is air on the outside than there is any other low-refractive-index material on the outside. That, according to Snell's law, means that the critical angle of light at the second face portion 42b and the third face portion 42c is a minimum when there is air on the outside. Therefore, when there is air on the outside, the range of the angle of incidence of light that is totally reflected at the second face portion 42b and the third face portion 42c becomes broadest, and the light incident to the daylighting sections 42 is efficiently guided to the far side of the base material 41. That can restrain loss of the light incident to the daylighting sections 42 and increase the luminance of the light emitted from the far side of the base material 41.

The refractive index of the base material 41 is preferably substantially equal to the refractive index of the daylighting sections 42. For example, if the refractive index of the base material 41 differs much from the refractive index of the daylighting sections 42, the light entering the base material 41 from the daylighting sections 42 may be undesirably refracted or reflected at the interface of the daylighting sections 42 and the base material 41. When this is actually the case, problems could occur including reduced luminance and a failure to achieve desired daylighting properties.

The daylighting plate 40 can be manufactured, for example, by forming the daylighting sections 42 on the base material 41 by photolithography. Alternatively, the daylighting plate 40 may be manufactured by melt extrusion, stamping, imprinting, or another like method instead of photolithography. In melt extrusion and stamping, the base material 41 and the daylighting sections 42 are formed of the same resin as a single piece.

Another method is to form the daylighting sections 42 on one of faces of a film and attach the film to the first face of the base material. Photolithography or imprinting techniques may be used to form the daylighting sections 42 on one of faces of a film.

Referring back to FIG. 1, the shading slats 6, delineating the shading area 7, each include an elongate and platelike shading base material 11 having a light-blocking function. The shading base material 11 may be any common "slat" for a window shade and may be made of, for example, metal, wood, or resin. The shading base material 11 may be painted or otherwise treated on the surface.

Not all of the shading slats 6 delineating the shading area 7 need to have a high light-blocking function. For example, some of the shading slats 6 delineating the shading area 7 may be transparent colored slats. The room interior becomes brighter if all or some of the shading slats 6 are such colored slats than if the shading slats 6 completely block outdoor light. The colored slats also prevent uncomfortable glaring light from coming into the line of sight of room occupants or striking computer monitor screens, thereby creating a comfortable indoor environment. In addition, the colored slats prevent people outside the room from peeping inside, which ensures privacy for the occupants.

The cross-sectional shape of the shading slats 6 when viewed perpendicular to the lengthwise direction thereof may be the same as the cross-sectional shape of the daylighting slats 4 shown in FIG. 3. This structure restrains stress and other unnecessary phenomena from occurring when the shading slats 6 are retracted.

The support mechanism 3 includes: sets of parallel ladder cords 12 arranged vertically (the widthwise direction of the slats 2); a securing box 13 holding the upper ends of the sets of ladder cords 12; and an up/down bar 14 attached to the lower ends of the sets of ladder cords 12.

Figure 4A:
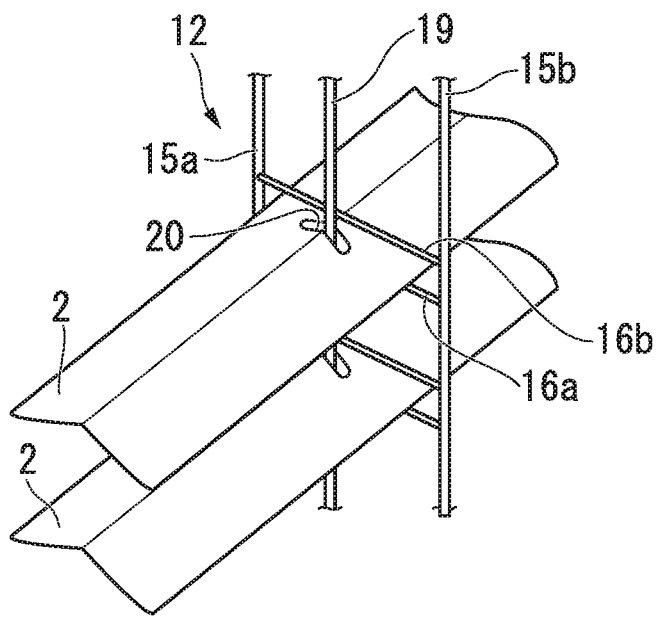
FIG. 4A is an enlarged perspective view of major parts of the daylighting device shown in FIG. 1 in an open state.
Figure 4B:
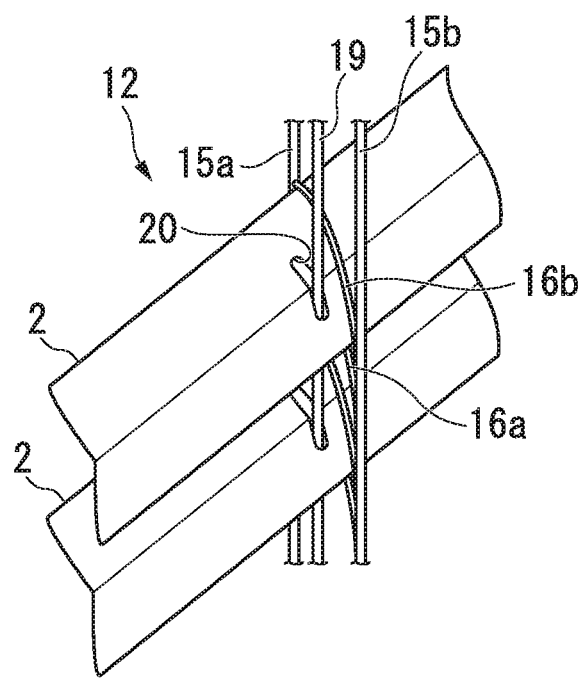
FIG. 4B is an enlarged perspective view of major parts of the daylighting device shown in FIG. 1 in a closed state.

FIGS. 4A and 4B are enlarged perspective views of major parts of the daylighting device 1. FIG. 4A shows open gaps between the slats 2. FIG. 4B shows closed gaps between the slats 2.

There are provided two sets of ladder cords 12, one to the left and the other to the right of the middle part of the slats 2. Each set of ladder cords 12, as shown in FIGS. 4A and 4B, includes: a pair of parallel, vertical cords 15a and 15b, one in the front and the other in the back; and pairs of horizontal cords 16a and 16b suspended, one over the other, between the vertical cords 15a and 15b. The pairs of horizontal cords 16a and 16b are disposed at equal intervals along the lengthwise direction of the vertical cords 15a and 15b (the vertical direction). Each slat 2 is inserted between a pair of vertical cords 15a and 15b and also between a pair of horizontal cords 16a and 16b.

As shown in FIG. 1, the securing box 13 sits atop and parallel to the parallel slats 2. On the other hand, the up/down bar 14 is positioned below and parallel to the parallel slats 2. The vertical cords 15a and 15b, constituting parts of the sets of ladder cords 12, are hung down from the securing box 13, stretched vertically downward under the weight of the up/down bar 14.

The support mechanism 3 includes: a manual up/down operation unit 17 for manually moving up and down the slats 2; and a manual tilting operation unit 18 for manually tilting the slats 2.

The manual up/down operation unit 17, as shown in FIGS. 1, 4A, and 4B, has a plurality of up/down cords 19. Each up/down cord 19 is provided parallel to a pair of vertical cords 15a and 15b that is a part of each set of ladder cords 12. The up/down cord 19 runs through holes 20 in the slats 2 and is fixed to the up/down bar 14 at the lower end thereof.

The up/down cord 19 is, near the upper end thereof, routed inside the securing box 13 and drawn out via an opening 21 formed on a side of the securing box 13. Coming out of the opening 21, the up/down cord 19 is then connected to an end of a manual operation cord 22. The other end of the manual operation cord 22 is fixed to an end of the up/down bar 14.

In the manual up/down operation unit 17, the up/down cords 19 are pulled into the securing box 13 if the manual operation cord 22 is pulled when the up/down bar 14 is at its lowest position. This operation causes the slats 2 to be sequentially stacked, starting from the lowest one, onto the up/down bar 14 and elevated together with the up/down bar 14. The up/down cords 19 can be secured using a stopper (not shown) provided inside the opening 21, which allows the up/down bar 14 to be stopped from moving at any desired height. Meanwhile, by releasing the up/down cords 19 from the stopper, the up/down bar 14 can be dropped under its own weight. This operation lowers the up/down bar 14 back to its lowest position.

The manual tilting operation unit 18, as shown in FIG. 1, includes an operation rod 23 near an end of the securing box 13. The operation rod 23 is attached pivotably around its axis. In the manual tilting operation unit 18, by rotating the operation rod 23 around its axis, the vertical cords 15a and 15b, constituting parts of the sets of ladder cords 12 shown in FIG. 4A, can be moved vertically in opposite directions. This operation causes the slats 2 to tilt in synchronism alternately between a state shown in FIG. 4A where the gaps between the slats 2 are open and a state shown in FIG. 4B where the gaps between the slats 2 are closed.

The daylighting device 1, structured as described above, is installed hanging down from an upper portion of, for example, a window pane so that the slats 2 face the indoor side of the window pane and also that the first regions 41Aa in which the daylighting sections 42 of the daylighting slats 4 are formed face the window pane in the daylighting area 5.

Figure 5:
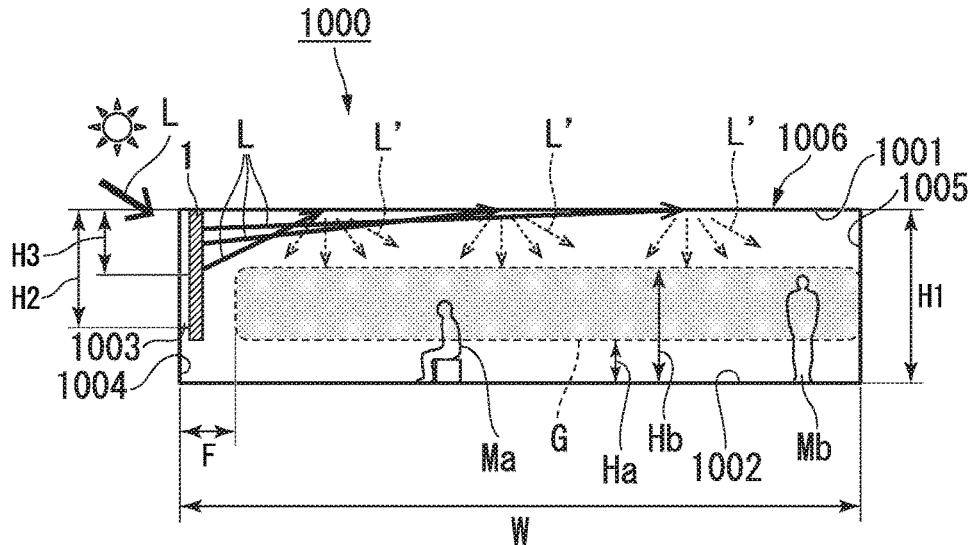
FIG. 5 is a schematic view of an exemplary room model in which a daylighting device is installed.

Now, the functions of the daylighting area 5 and the shading area 7 of the daylighting device 1 will be described using a room model 1000 shown in FIG. 5. FIG. 5 is a schematic view of the exemplary room model 1000 in which the daylighting device 1 is installed.

In the room model 1000, the daylighting device 1 is assumed to be used in an office room as an example. Specifically, the room model 1000 shown in FIG. 5 shows outdoor light L coming from an obliquely upward direction through a window pane 1003 into a room 1006 surrounded by a ceiling 1001, a floor 1002, a front wall 1004 where the window pane 1003 is installed, and a back wall 1005 opposite the front wall 1004. The daylighting device 1 is installed over the indoor side of the window pane 1003.

In the room model 1000, the room 1006 has a height H1 (dimension from the ceiling 1001 to the floor 1002) of 2.7 meters. The window pane 1003 has a vertical dimension H2 of 1.8 meters from the ceiling 1001. The daylighting sections 5 have a vertical dimension H3 of 0.6 meters from the ceiling 1001. The room 1006 has a depth W (dimension from the front wall 1004 to the back wall 1005) of 16 meters.

In the room model 1000, there are an occupant Ma sitting on a chair in the middle of the room 1006 and an occupant Mb standing on the floor 1002 in a deep part of the room 1006. The eye level Ha of the occupant Ma sitting on the chair is 0.8 meters above the floor 1002. The eye level Hb of the occupant Mb standing on the floor 1002 is 1.8 meters above the floor 1002.

The occupants Ma and Mb of the room 1006 experience glare in the range between the eye levels Ha and Hb (hereinafter, a "glare area" G). An area F near the window pane 1003 of the room 1006 is primarily illuminated directly by the outdoor light L coming through the window pane 1003. The area F is up to one meter from the front wall 1004. Therefore, the glare area G does not include the area F and stretches from the position one meter away from the front wall 1004 all the way to the back wall 1005 and heightwise, from 0.8 meters to 1.8 meters above the floor 1002.

Figure 6:
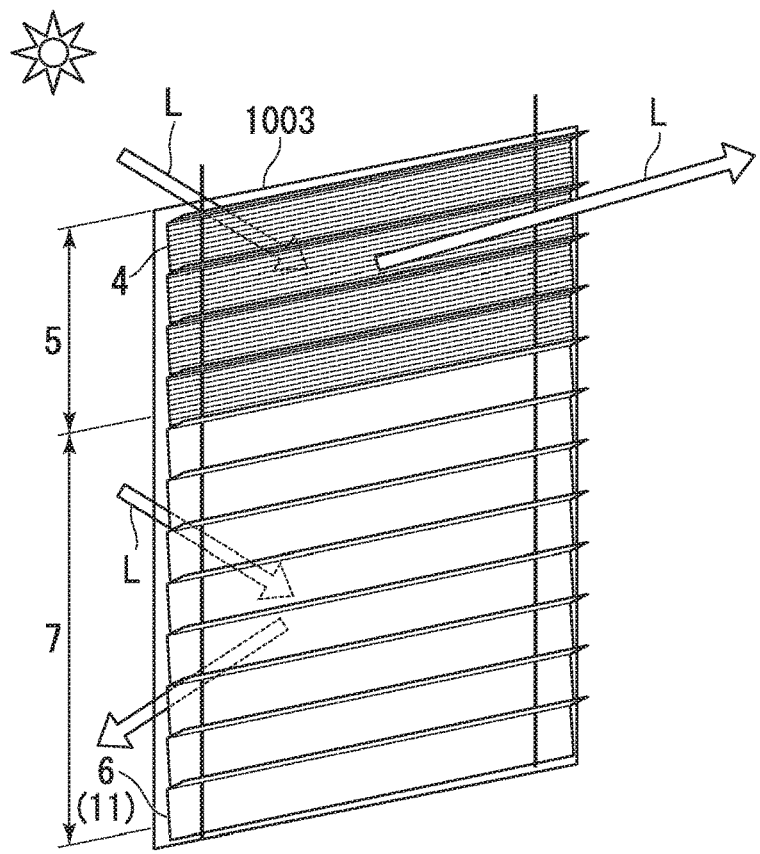
FIG. 6 is a perspective view illustrating functions of a daylighting area and a shading area of the daylighting device shown in FIG. 1.

In the daylighting area 5, as shown in FIGS. 5 and 6, the light L enters each daylighting slat 4 through one of the faces thereof from an obliquely upward direction and exits the daylighting slat 4 through another face thereof in the obliquely upward direction. Specifically, referring to FIG. 7, in each daylighting slat 4, the light L enters the daylighting sections 42 through the second face portions 42b, totally reflects off the third face portions 42c, and then exits through the other face of the base material 41 in the direction of the ceiling 1001.

The daylighting slat 4 is preferably designed so that this exiting light does not re-enter the second portion 41b of the base material 41. Specifically, the angle θ between the first portion 41a and the second portion 41b, both a part of the base material 41, and the length L2 of the second portion 41b are specified appropriately in accordance with the shape of the daylighting sections 42 in the first region 41Aa. This design of the shape of the daylighting slat 4 prevents the light exiting the base material 41 through the other face thereof from re-entering the second portion 41b of the base material 41. Thus, the design prevents any part of the light emitted in the direction of the ceiling 1001 from being reflected by the second portion 41b of the base material 41 in the direction of the floor 1002.

The angled shape of the base material 41 constituting a part of the daylighting slat 4 causes the first region 41Aa in which the daylighting sections 42 of the base material 41 are provided to become parallel to the window pane 1003 when the daylighting device is fully closed.

Figure 8A:
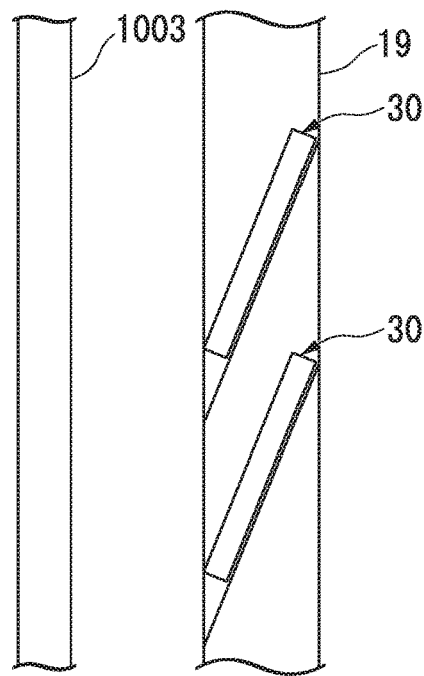
FIG. 8A is an illustration of flat, platelike daylighting slats where the slats are pivoted.
Figure 8B:
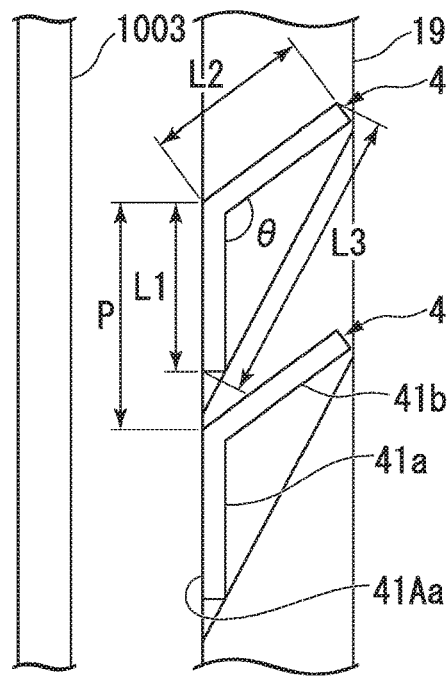
FIG. 8B is an illustration of angled daylighting slats in accordance with an aspect of the present invention where the slats are pivoted.

FIG. 8A is an illustration of flat, platelike daylighting slats where the slats are pivoted. FIG. 8B is an illustration of angled daylighting slats where the slats are pivoted.

Referring to FIG. 8A, if flat, platelike daylighting slats are used, the daylighting slats 30 do not become parallel to, but become tilted with respect to, the window pane 1003 when the daylighting slats 30 are pivoted. In other words, the end portions of the vertically aligned daylighting slats 30 overlap in plan view in this structure so as to prevent light from leaking through into the room. Therefore, no matter how the up/down cords 19 shown in FIG. 1 are operated, it is impossible to pivot the daylighting slats 30 into an upright position because the end portions of the vertically aligned daylighting slats 30 collide. In this structure, a sufficient daylighting function is not available if the daylighting slats 30 are designed so as to achieve a maximum daylighting effect when the daylighting slats 30 are in an upright position. Meanwhile, if the daylighting slats 30 are designed so as to achieve a maximum daylighting effect when the daylighting slats 30 are tilted, it becomes difficult to design the shape of the daylighting sections.

In contrast, referring to FIG. 8B, if the angled daylighting slats 4 are used, portions of the vertically aligned daylighting slats 4 (the first regions 41Aa of the first portions 41a) become parallel to the window pane 1003 when the daylighting slats 4 are pivoted. This structure therefore provides maximum intended daylighting properties.

Furthermore, still referring to FIG. 8B, to achieve maximum daylighting properties when the daylighting device is fully closed, it is preferable that the first portions 41a of the daylighting slats 4 be disposed closely together, leaving only practically no gaps between the adjacent first portions 41a of the daylighting slats 4 when the daylighting device is fully closed. To arrange the first portion 41a closely together when the daylighting device is fully closed, it is preferable to design the length L1 of the first portion 41a, the length L2 of the second portion 41b, the angle θ between the first portion 41a and the second portion 41b, the width L3 of the slat, and the pitch P of the adjacent slats.

How closely the daylighting slats 4 in accordance with the present embodiment are arranged when the daylighting device is fully closed (daylighting area ratio) is calculated, for example, in the following manner.

In the present embodiment, the base material 41 is bent along a centerline thereof that is parallel to the lengthwise direction thereof. Therefore, the length L1 of the first portion 41a, which is equal to the length L2 of the second portion 41b, is given by the formula: $L1=L3\times(1/\cos((180-\theta)/2))$. In commercially available, typical window shades, the slat width L3 and the slat pitch P satisfy a certain relationship, Assuming that the slats in such a commercially available window shade be modified for use as the daylighting slats 4 in accordance with the present embodiment, it follows that $L3/\approx1.2$, In the fully closed state, the ratio of the first portion 41a to the slat pitch P is equal to the daylighting area ratio (no further calculation involved). Rearranging these equations to relate the slat pitch P to the length L1 of the first portion 41a, we obtain an equation: $L1/P\approx1.2\times(1/2)\times(1/\cos((180-\theta)/2))$. If, for example, $\theta=150°$, $L1/P\approx0.62$, and the daylighting area ratio is equal to 62%.

Of the light L entering the room 1006 through the window pane 1003, the light traveling in the direction of the ceiling 1001 has an increased luminance whereas the light traveling toward the glare area G and the light traveling in the direction of the floor 1002 have a decreased luminance as shown in FIG. 5, as a result of the use of such daylighting slats 4. In other words, the light L entering the room 1006 through the window pane 1003 is efficiently guided in the direction of the ceiling 1001. The light L traveling in the direction of the ceiling 1001 can illuminate deep into the room 1006 without causing the occupants Ma and Mb of the room 1006 to experience glare.

In addition, light L', or reflection off the ceiling 1001, illuminates brightly across a large area of the room 1006 in place of artificial lighting. If lighting equipment in the room 1006 is turned off, energy can be saved as much as the lighting equipment in the room 1006 would otherwise consume during the daytime.

Referring to FIGS. 5 and 6, in the shading area 7, the light L hits one of faces of each shading slat 6 from an obliquely upward direction and is blocked by the shading slat 6. Since the shading area 7 is below the daylighting area 5, the shading slats 6 primarily that block part of the tight L entering the room 1006 through the window pane 1003 which travels in the direction of the glare area G and the floor 1002.

Figure 9A:
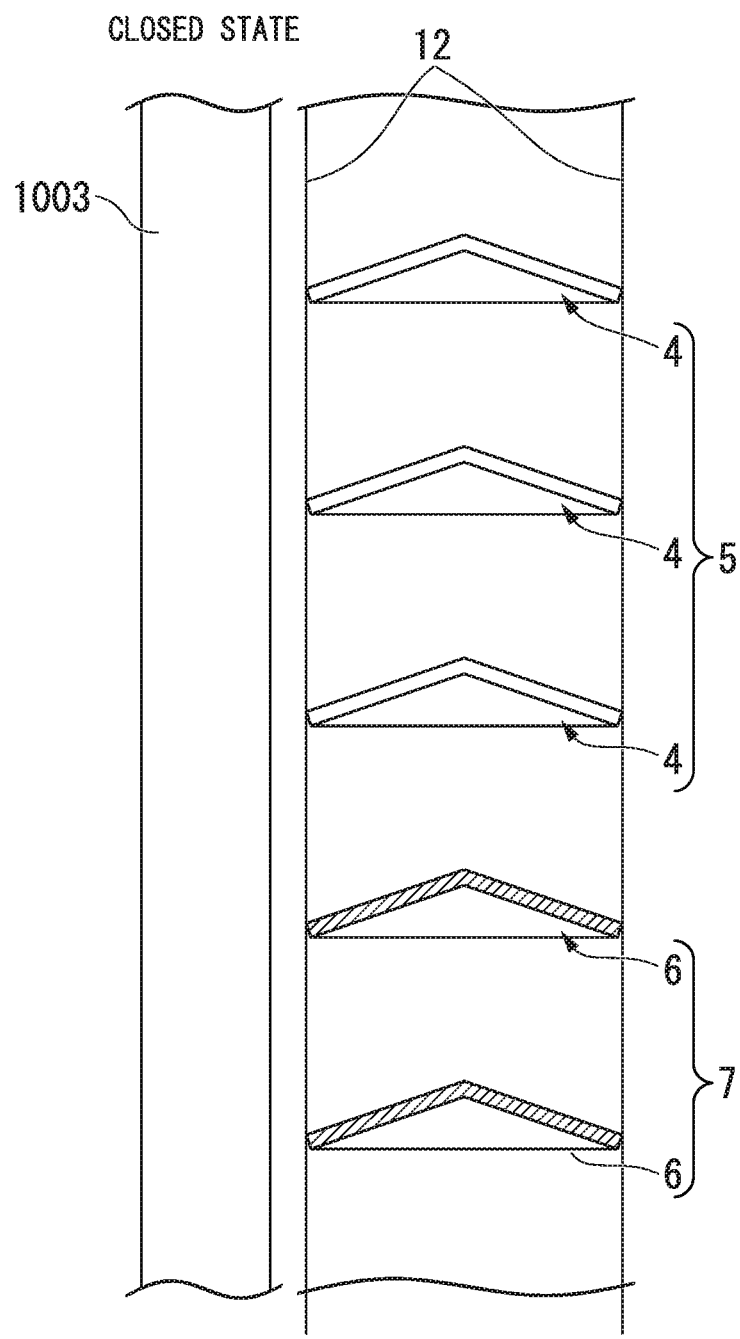
FIG. 9A is a first side view illustrating a function of shading slats constituting a shading section.
Figure 9B:
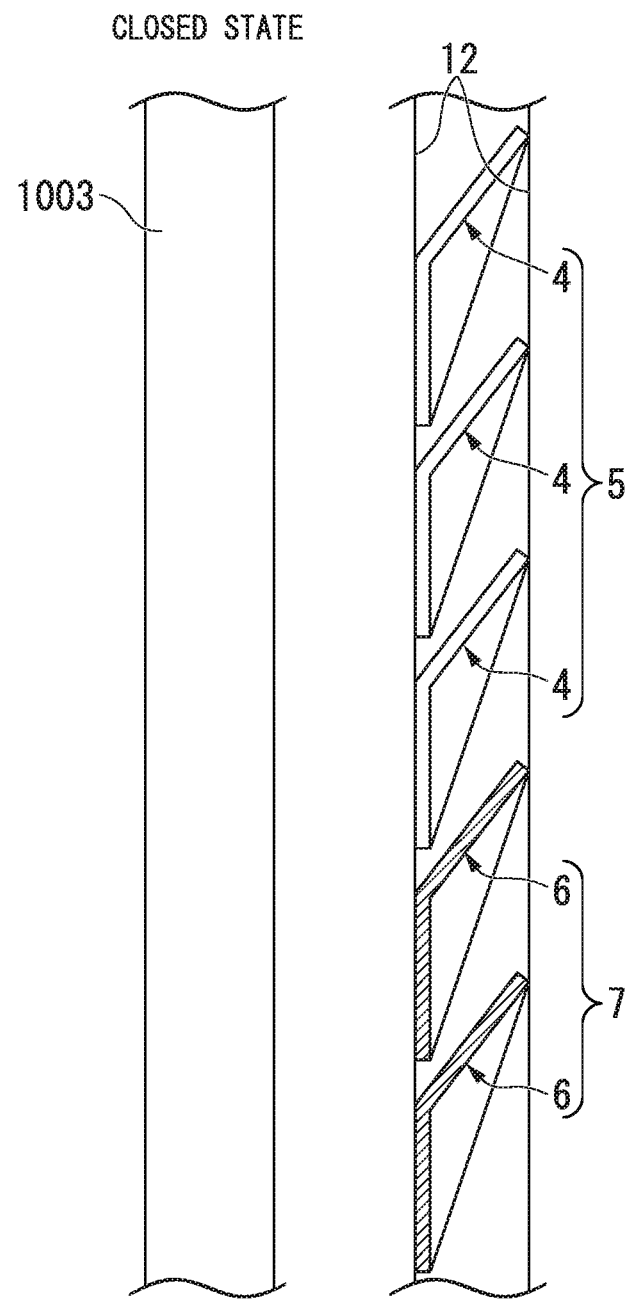
FIG. 9B is a second side view illustrating a function of the shading slats constituting the shading section.
Figure 9C:
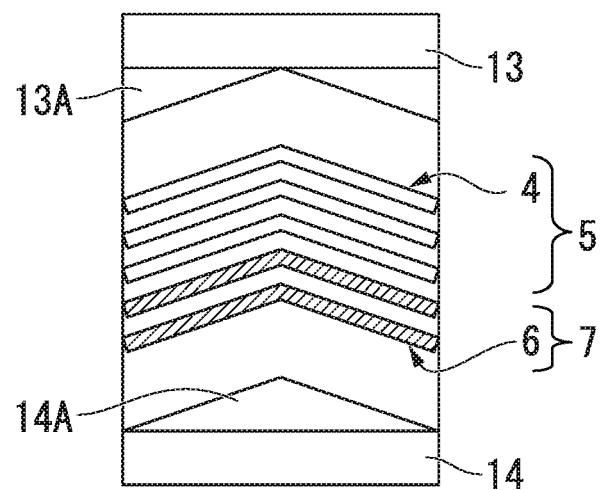
FIG. 9C is a third side view illustrating a function of the shading slats constituting the shading section.

FIG. 9A to 9C are side views illustrating a function of the shading slats 6 delineating the shading area 7 where the gaps between the slats 2 are open, where the gaps between the slats 2 are closed, and where the slats 2 are retracted, respectively.

The shading slats 6 in this example have the same shape as the daylighting slats 4. The shading slats 6, having the same shape as the daylighting slats 4, do not undergo locally increased stress when retracted. That in turn prevents cross-sectional deformation of the shading slats 6. The securing box 13 and the up/down bar 14 are preferably provided with auxiliary members 13A and 14A that assist the slats 2 when slats 2 are retracted as shown in FIG. 9C.

In the daylighting device 1, as shown in FIGS. 9A and 9B, the angle at which the light L travels from the daylighting area 5 in the direction of the ceiling can be regulated by manually tilting the slats 2. On the other hand, by manually tilting the slats 2 in the shading area 7, the light L entering through gaps between the shading slats 6 can be regulated, and the outside can be made visible between the shading slats 6 through the window pane 1003.

The window pane 1003 can be partially "opened." For example, that part of the window pane 1003 which faces the shading area 7 can be "opened" in the daylighting device 1 by stacking the slats 2, one on top of the other starting from the lowest one, as shown in FIG. 9C, and hence elevating the up/down bar 14 until the up/down bar 14 reaches the position that, when the up/down bar 14 is at its lowest level, corresponds to the boundary of the daylighting area 5 and the shading area 7. If the up/down bar 14 is elevated further to its highest position, the window pane 1003 is fully opened.

In FIGS. 9A to 9C, the shading slats 6 are shown assuming that they have the same shape as the daylighting slats 4. Alternatively, the shading slats 6 may be shaped like a flat plate. For the latter case, HS A4801, "Steel and aluminum alloy Venetian blinds," specifies that the slats should have a 3-mm or wider overlap allowance if they have a width of 35 mm or greater and a 2-mm or wider overlap allowance if they have a width of less than 35 mm and also that the slats should not allow people to see through them in the horizontal direction when they are in a fully closed state. The gaps between the shading slats 6 (slat pitch) preferably meet these JIS requirements when they are in the closed state.

As described in the foregoing, the use of the daylighting device 1 in accordance with the present embodiment causes the light L entering the room 1006 through the window pane 1003 to be guided by the daylighting slats 4 delineating the daylighting area 5 in the direction of the ceiling 1001 of the room 1006 and the light L to be restrained by the shading slats 6 delineating the shading area 7 from traveling toward the glare area G.

Hence, in the daylighting device 1, the daylighting area 5 efficiently admits natural outdoor light (sunlight) into the room 1006, thereby illuminating brightly deep into the room 1006 without having to cause the occupants Ma and Mb of the room 1006 to experience glare. Meanwhile, the shading area 7 mitigates light entering through the window pane 1003 and also prevents people from peeping inside the room 1006 through the window pane 1003.

The present invention is by no means limited to the structure of the daylighting device 1 described so far as the first embodiment. Various modifications are possible without departing from the scope of the present invention.

Variation examples of the base material are shown in FIGS. 10A to 10F. FIGS. 10A to 10F are cross-sectional views of variation examples of the base material.

Figure 10A:
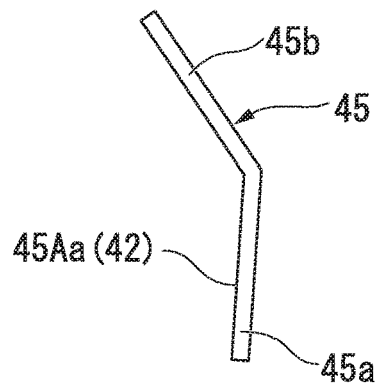
FIG. 10A is a first cross-sectional view of a variation example of a support member.

As an example, a base material 45 shown in FIG. 10A is of the same structure as that shown in FIGS. 2 and 3 in that the base material 45 includes a first portion 45a and a second portion 45b and differs in the direction in which the second portion 45b extends.

Figure 10B:
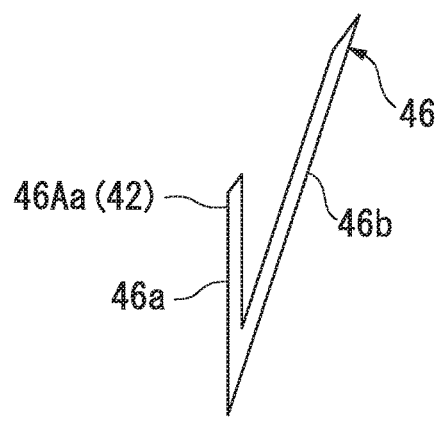
FIG. 10B is a second cross-sectional view of a variation example of the support member.

A base material 46 shown in FIG. 10B is of the same structure as that shown in FIGS. 2 and 3 in that the base material 46 includes a first portion 46a and a second portion 46b and differs in on which end of the first portion 46a the second portion 46b is positioned.

Figure 10C:
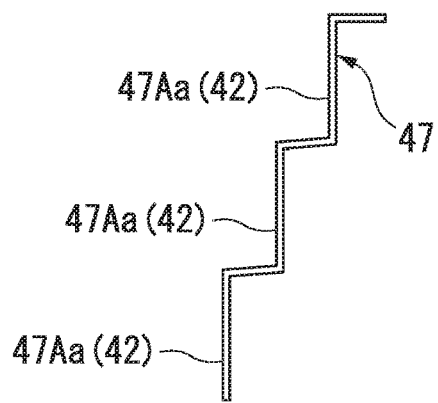
FIG. 10C is a third cross-sectional view of a variation example of the support member.

The base material does not necessarily include the first portion and the second portion. For example, the base material may have a "zigzag" shape (base material 47) in a cross-sectional view taken perpendicular to the lengthwise direction thereof, as shown in FIG. 10C where first portions and second portions are alternately connected at right angles. As another example, a base material 48 shown in FIG. 10D includes an additional portion linking both ends of the base material 41 shown in FIGS. 2 and 3 and has a tubular triangle shape in a cross-sectional view taken perpendicular to the lengthwise direction of the base material 48. This tubular shape is not necessarily triangular and may alternatively be polygonal. A base material 49 shown in FIG. 10E differs from the base material 41 shown in FIGS. 2 and 3 in that the base material 49 has a groove in which a part of the base material is cut out. A base material 410 in FIG. 10F is not angled, but curved.

In any of these base material variations, the portion that includes the face that becomes perpendicular to the window pane 1003 when the daylighting device is fully closed is termed a first region 45Aa to 49Aa or 410Aa. The first regions 45Aa to 49Aa and 410Aa are provided with daylighting sections 42. The daylighting sections 42 may be directly formed on the first regions 45Aa to 49Aa and 410Aa and may be attached thereto via a film. For the structure shown in FIG. 10E, a member on which the daylighting sections 42 are formed may be fitted into the groove.

Figure 7:
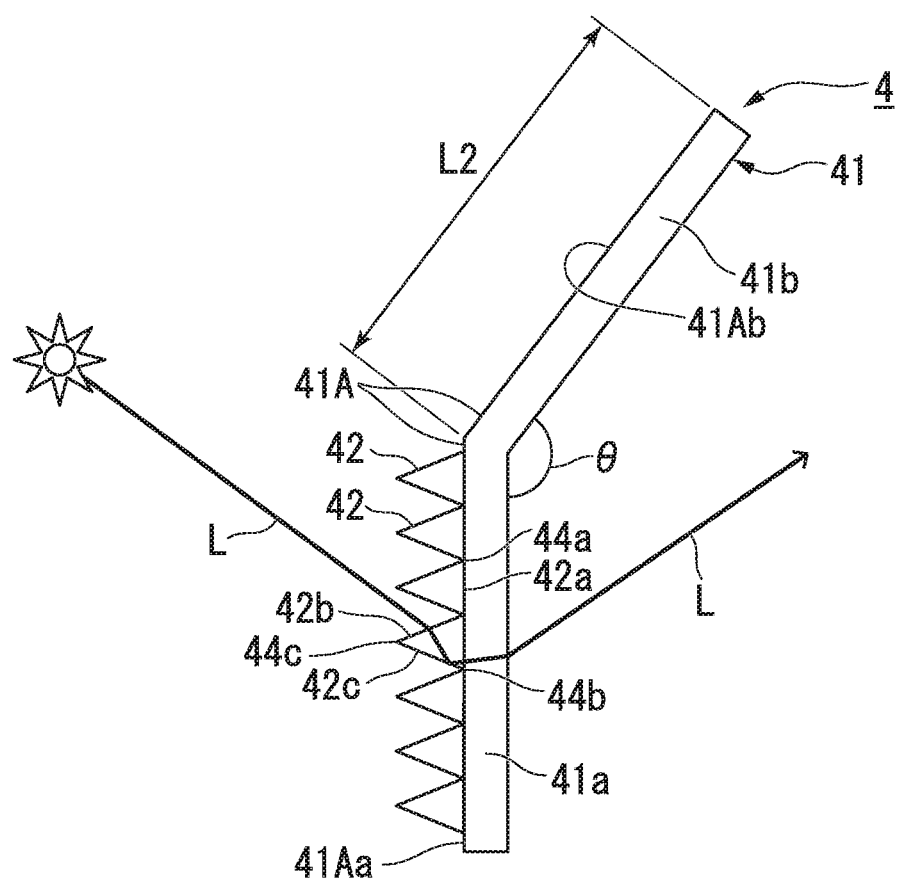
FIG. 7 is a side view illustrating a function of daylighting slats delineating e daylighting area.
Figure 11:
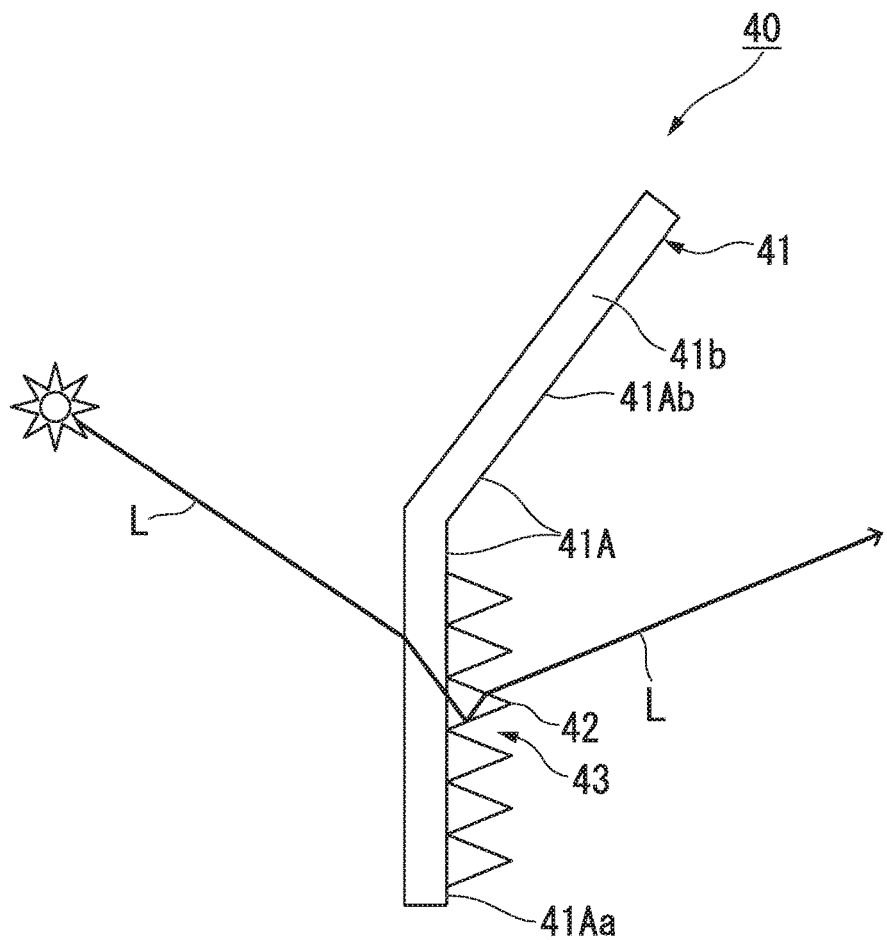
FIG. 11 is a cross-sectional view of a variation example of the daylighting plate.

The daylighting sections 42 only need to be formed in the first region 41Aa that has a face that can be perpendicular to the window pane 1003 and do not necessarily have the structure shown in FIG. 7. As shown in FIG. 11, the daylighting sections 42 may be formed to face the interior of the room 1006. In this structure, the refractive index difference between the daylighting sections 42 and the gap portions 43 is preferably adjusted appropriately so that the daylighting sections 42 do not converge light. Note that the first face 41A on which the daylighting sections 42 are provided is, in this structure, opposite the first face 41A in FIG. 7.

Figure 12A:
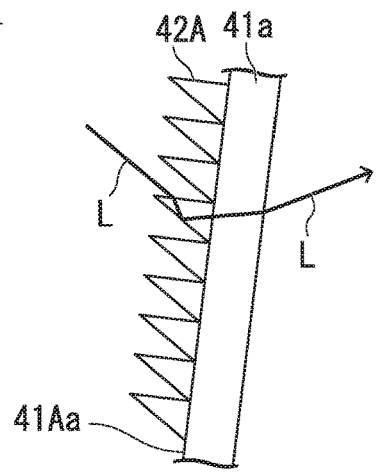
FIG. 12A is a first side view of a variation example of daylighting sections of a daylighting slat.
Figure 12B:
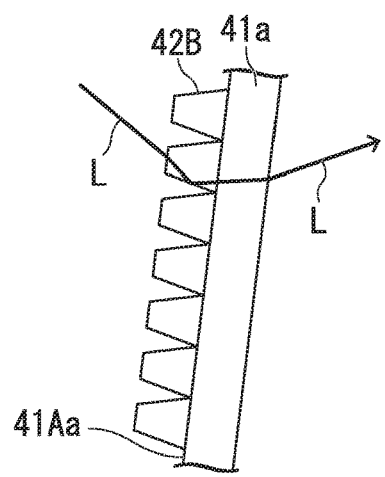
FIG. 12B is a second side view of a variation example of the daylighting sections of the daylighting slat.
Figure 12C:
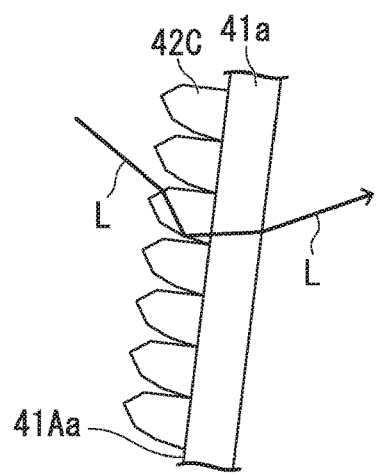
FIG. 12C is a third side view of a variation example of the daylighting sections of the daylighting slat.

The daylighting sections 42 are not necessarily constituted by the above-described prismatic members having a triangular shape in a cross-sectional view taken perpendicular to the lengthwise direction thereof. FIG. 12A shows one of alternative examples where daylighting sections 42A are constituted by prismatic members having a right-triangle cross-sectional shape. FIG. 12B shows another alternative example where daylighting sections 42B are constituted by prismatic members having a trapezoidal (rectangular) cross-sectional shape. As further examples, the cross-sectional shape may be pentagonal, hexagonal, or any other suitably modified shape. FIG. 12C shows daylighting protrusion portions 42C having a hexagonal shape in a cross-sectional view taken perpendicular to the lengthwise direction thereof.

The number, size, and other specifics of the slats 2 may be altered in a suitable manner in accordance with the size of the window pane 1003. In accordance with these specifics, there may be provided more sets of ladder cords 12 to hold the slats 2 parallel to each other.

The up/down cords 19 in the manual up/down operation unit 17 may be omitted. The omission of the holes 20, through which the up/down cords 19 are passed, eliminates leakage of light through the holes 20.

In the daylighting device 1 described so far, the daylighting slats 4, that is, those slats 2 which delineate the daylighting area 5, are disposed at the top, and the shading slats 6, that is, those slats 2 which delineate the shading area 7, are disposed at the bottom. This is however not the only feasible structure. It is sufficient if only some of the slats 2 are the daylighting slats 4. For example, the daylighting area 5 is not necessarily delineated by those slats 2 located at the top, and another shading area 7 may be provided above the daylighting area 5. Alternatively, as an example, the daylighting slats 4 and the shading slats 6 may be arranged in a mixed manner, with local ratios gradually changing vertically so that the slats 2 include more shading slats 6 closer to the top and more daylighting slats 4 closer to the bottom. The layout of the daylighting slats 4 and the shading slats 6 may be altered where necessary as long as the present invention can achieve its intended effects.

The manual up/down operation unit 17 and the manual tilting operation unit 18 in the support mechanism 3 are structured for manual operation. Alternatively, a driving motor or other driving means may be used to automate the vertical and tilting operations of the slats 2.

Figure 13A:
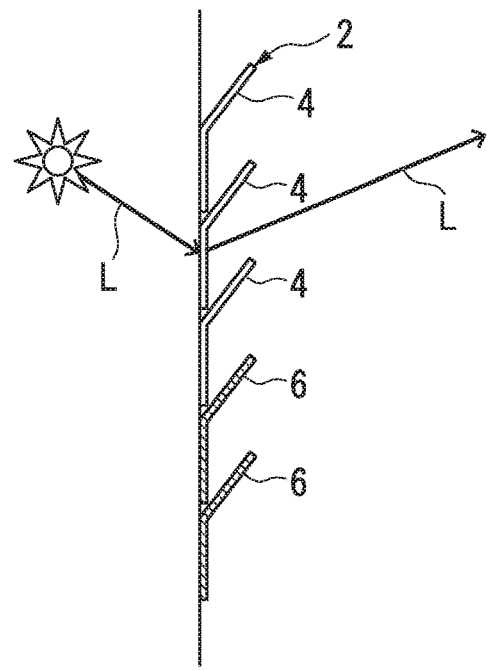
FIG. 13A is a first side view illustrating a tilting motion of daylighting slats and shading slats.
Figure 13B:
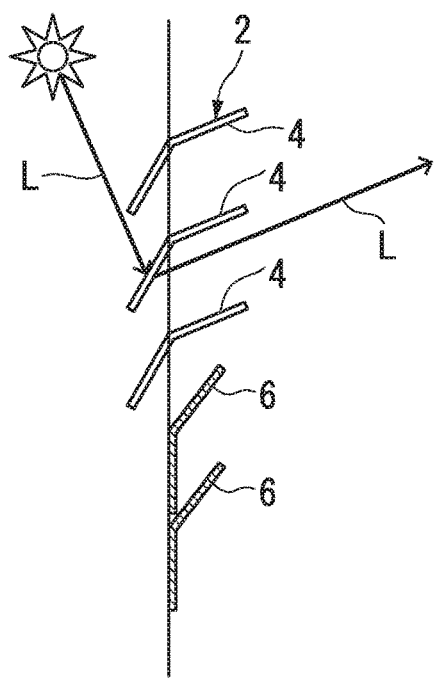
FIG. 13B is a second side view illustrating a tilting motion of the daylighting slats and the shading slats.
Figure 13C:
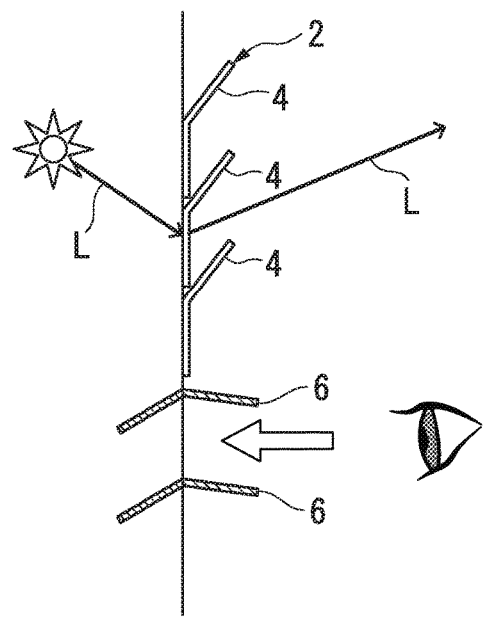
FIG. 13C is a third side view illustrating a tilting motion of the daylighting slats and the shading slats.

Furthermore, in the support mechanism 3, the daylighting slats 4 delineating the daylighting area 5 and the shading slats 6 delineating the shading area 7 may be independently tilted as shown, for example, in FIGS. 13A to 13C.

Specifically, referring to FIGS. 5 and 13A, when both the daylighting area 5 and the shading area 7 are closed, the light L entering the room 1006 through the window pane 1003 is guided in the direction of the ceiling 1001 of the room 1006 by the daylighting slats 4 delineating the daylighting area 5, and the light L traveling toward the glare area G is mitigated by the shading slats 6 delineating the shading area 7.

Meanwhile, referring to FIGS. 5 and 13B, when the sun's altitude is relatively high, the angle of the daylighting slats 4 is adjusted by pivoting only the daylighting slats 4 delineating the daylighting area 5 in accordance with the sun's high altitude. Thus, the light L entering the room 1006 through the window pane 1003 is guided in the direction of the ceiling 1001 of the room 1006 by the daylighting slats 4 delineating the daylighting area 5 in the same manner as in FIGS. 5 and 13A.

Referring to FIGS. 5 and 13C, if only the shading slats 6 delineating the shading area 7 are pivoted, the shading area 7 opens whereas the daylighting area 5 remains closed. Thus, the light L entering the room 1006 through the window pane 1003 is guided in the direction of the ceiling 1001 of the room 1006 by the daylighting slats 4 delineating the daylighting area 5, and the outside becomes visible between the shading slats 6 delineating the shading area 7 through the window pane 1003.

Second Embodiment

Next will be described daylighting slats in accordance with a second embodiment. The daylighting slat of the present embodiment described below has substantially the same basic structure as that of the first embodiment and differs in that the former further includes a support member. The following description will therefore focus on the structure of the support member, skipping description of common features. In the drawings referred to in the following description, members that are the same as those in FIGS. 1 to 13C are denoted by the same reference signs or numerals.

Figure 14:
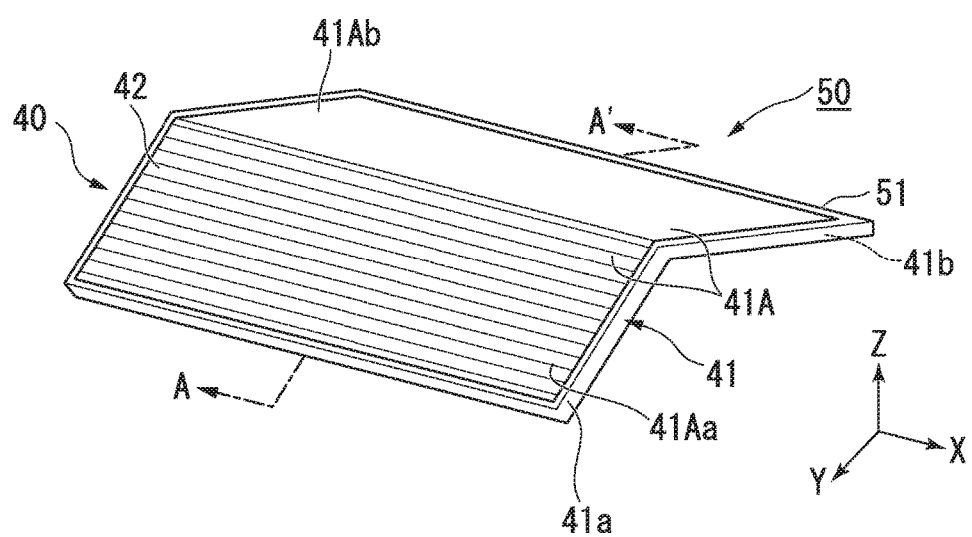
FIG. 14 is a schematic perspective view of a structure of a daylighting slat in accordance with a second embodiment.

FIG. 14 is a schematic cross-sectional view of a structure of a daylighting slat in accordance with the second embodiment.

Referring to FIG. 14, a daylighting slat 50 in accordance with the present embodiment includes a support member 51 supporting the daylighting plate 40. The support member 51 may have any shape as long as it can support the daylighting plate 40. For example, the support member 51 may be a frame supporting the daylighting plate 40 along its periphery as shown in FIG. 14.

If the daylighting plate 40 measures approximately from 0.5 to 1.0 mm in thickness and is used without a frame, it could warp and develop other like problems over time. The daylighting plate 40, since being supported by the support member 51, will less likely undergo undesirable changes over time.

Figure 10D:
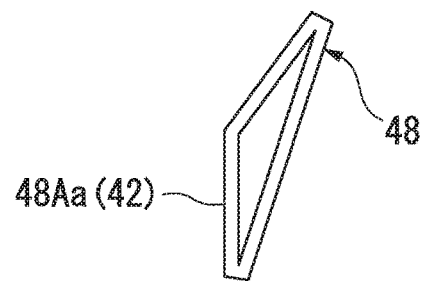
FIG. 10D is a fourth cross-sectional view of a variation example of the support member.
Figure 10E:
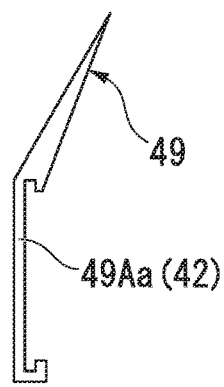
FIG. 10E is a fifth cross-sectional view of a variation example of the support member.
Figure 10F:
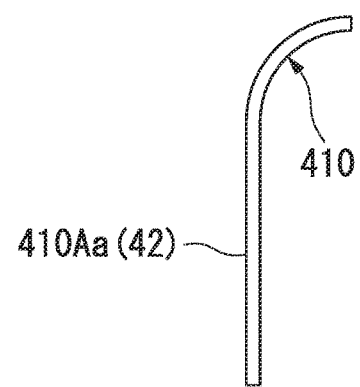
FIG. 10F is a sixth cross-sectional view of a variation example of the support member.

If the daylighting plate 40 has an opening as shown in FIG. 10D, a metallic or other rigid member may be inserted inside the opening where the rigid member will not disrupt light's passage.

Third Embodiment

Next will be described a structure of daylighting slats in accordance with a third embodiment of the present invention.

The daylighting slat of the present embodiment described below differs from those of the foregoing embodiments in that additional daylighting sections with a different daylighting function are provided in the second portion that is curved or angled with respect to the first region of the base material. The following description will skip description of features that are the same as those of the foregoing embodiments. In the drawings referred to in the following description, members that are the same as those in FIGS. 1 to 13C are denoted by the same reference signs or numerals.

Figure 15A:
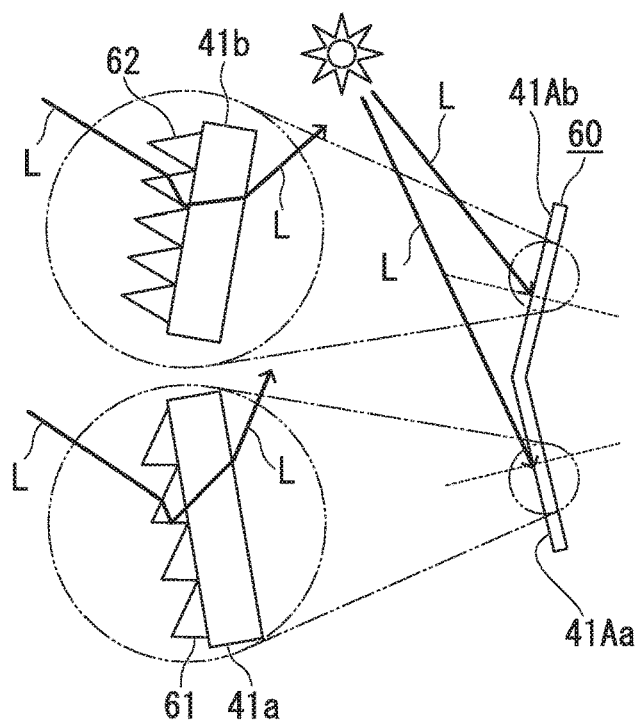
FIG. 15A is a first enlarged cross-sectional view of major parts of a daylighting slat in accordance with a third embodiment
Figure 15B:
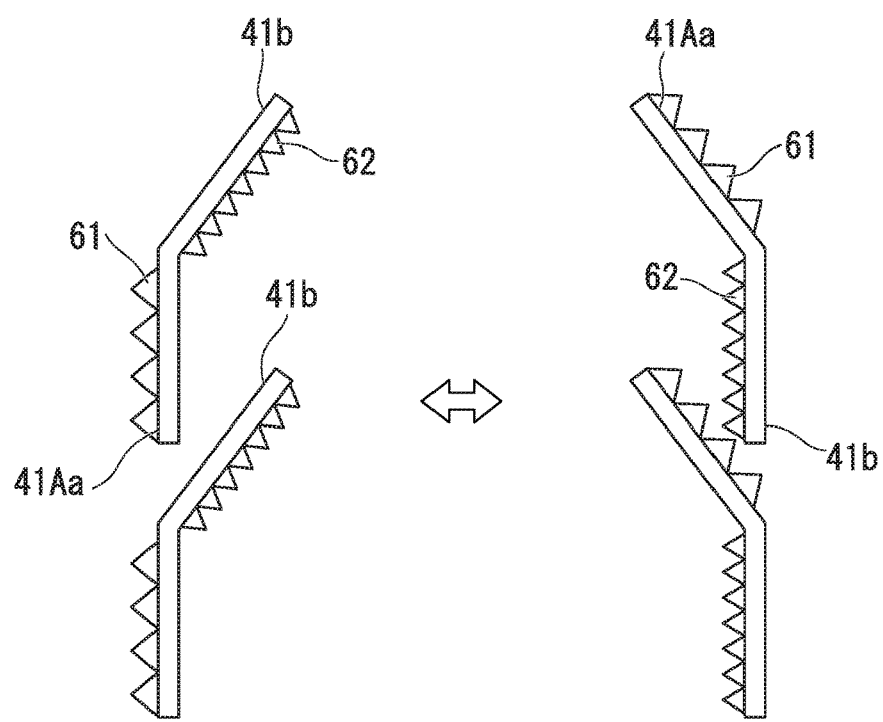
FIG. 15B is a second enlarged cross-sectional view of major parts of daylighting slats in accordance with the third embodiment.

FIGS. 15A and 15B are enlarged cross-sectional views of major parts of a daylighting slat in accordance with the third embodiment.

Referring to FIG. 15A, in a daylighting slat 60 in accordance with the present embodiment, the first region 41Aa and the second region 41Ab of the first face 41a have different daylighting functions.

Referring to FIG. 15A, a plurality of first daylighting sections 61 in the first region 41Aa and a plurality of second daylighting sections 62 in the second region 41Ab have different shapes in cross-sectional views thereof. Each first daylighting section 61 is constituted by a prismatic member so angled that the light incident to the first region 41Aa is projected in the direction of a part of the ceiling 1001 of the room 1006 that is near the window.

In contrast, each second daylighting section 62 is constituted by a prismatic member so angled that the light incident to the second region 41Ab is projected in the direction of a part of the ceiling 1001 of the room 1006 that is deep inside the room 1006.

In this structure, the light L entering the daylighting slat 60 exits the first daylighting sections 61 and the second daylighting sections 62 at different angles, being projected in the direction of a part of the ceiling 1001 of the room 1006 that is near the window and a part of the ceiling 1001 of the room 1006 that is deep inside the room 1006 respectively. Therefore, the structure is capable of projecting light substantially across the entire ceiling 1001 of the room 1006, irrespective of the sun's altitude. In addition, since the daylighting slat 60 in accordance with the present embodiment has an angled shape, the daylighting slat 60 is capable of continuously changing the angle at which incident light exits the daylighting slat 60 in the direction of the ceiling 1001 of the room 1006. The structure is hence capable of projecting more uniform light L in the direction of the ceiling 1001.

FIG. 15A shows the first daylighting sections 61 and the second daylighting sections 62 provided on the same face of the daylighting slat 60. This is however not the only feasible arrangement. More specifically, the second daylighting sections 62 may be provided on either one of faces of the second portion 41b that is curved or angled with respect to the first region 41Aa of the base material. FIG. 15B is a schematic cross-sectional view of the daylighting slats 60 in which the second daylighting sections 62 are disposed on a face, opposite the first region 41Aa, of the second portion 41b curved or angled with respect to the first region 41.Aa of the base material. Since the first daylighting sections 61 and the second daylighting sections 62 are disposed on opposite faces of the base material, different portions of the daylighting slat 60 could be placed parallel to the window in accordance with usage. For example, the face on which the first daylighting sections 61 are formed can be placed parallel to the window in summer when the sun is relatively high in the sky, whilst in winder when the sun is relatively low, the face on which the second daylighting sections 62 are formed can be placed parallel to the window. This structure hence enables easy switching between different sets of daylighting sections for use, to achieve suitable daylighting properties in accordance with time, season, and other usage conditions.

Fourth Embodiment

Next will be described a structure of daylighting slats in accordance with a fourth embodiment of the present invention.

The daylighting slat of the present embodiment described below has substantially the same basic structure as that of the first embodiment and differs in that the former further includes a light-diffusion film. The following description will therefore focus on a structure of the light-scattering film and members surrounding the film, skipping description of common features. In the drawings referred to in the following description, members that are the same as those in FIGS. 1 to 13C are denoted by the same reference signs or numerals.

Figure 16:
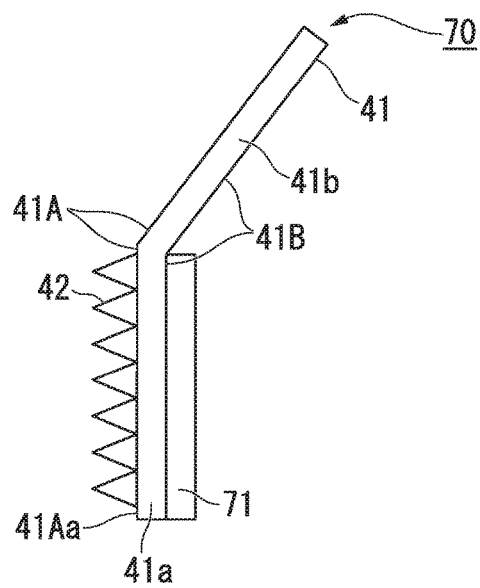
FIG. 16 is an enlarged cross-sectional view of major parts of a daylighting slat in accordance with a fourth embodiment.

FIG. 16 is an enlarged view of major parts of a daylighting slat in accordance with the fourth embodiment. Referring to FIG. 16, a daylighting slat 70 in accordance with the present embodiment includes a light-diffusion layer (light-diffusion film) 71 on a second face of the base material 41. The diffusion film 71 may be attached to the second face of the base material 41 and when the base material is structured as in FIG. 10D, may be fitted into a mating section.

As shown in FIG. 16, the light-diffusion film 71 is disposed to cover a part of a second face 419 of the base material 41 opposite the first region 41Aa. The light-diffusion film 71 therefore diffuses the light transmitted through the daylighting sections 42. The light-diffusion film 71 preferably has anisotropic light-scattering properties where it spreads light primarily in the horizontal direction (in the lengthwise direction of the daylighting slat 70) and hardly in the vertical direction (the widthwise direction of the daylighting slat 70).

The light-diffusion layer is a single light-diffusion film 71 in the present embodiment and alternatively may be a stack of two or more light-diffusion films 71.

The daylighting slat 70 in accordance with the present embodiment includes the light-diffusion film 71 on the light-emitting side of the substrate 41. The light-diffusion film 71 therefore diffuses the light traveling in the direction of the ceiling 1001 (FIG. 5) from the daylighting slat 70, thereby projecting more uniform light in the direction of the ceiling 1001 (see FIG. 5). The structure achieves uniform brightness along the depth of the room especially when the light-diffusion film 71 has anisotropic light-scattering properties.

Fifth Embodiment

Next will be described a structure of daylighting slats in accordance with a fifth embodiment of the present invention.

The daylighting slat of the present embodiment described below has substantially the same basic structure as that of the first embodiment and differs in that the base material of the former is bent along a straight line that is parallel to the lengthwise direction of the base material and offset from the centerline. The following description will therefore focus on such a daylighting slat, skipping description of common features. In the drawings referred to in the following description, members that are the same as those in FIGS. 1 to 13C are denoted by the same reference signs or numerals.

Figure 17:
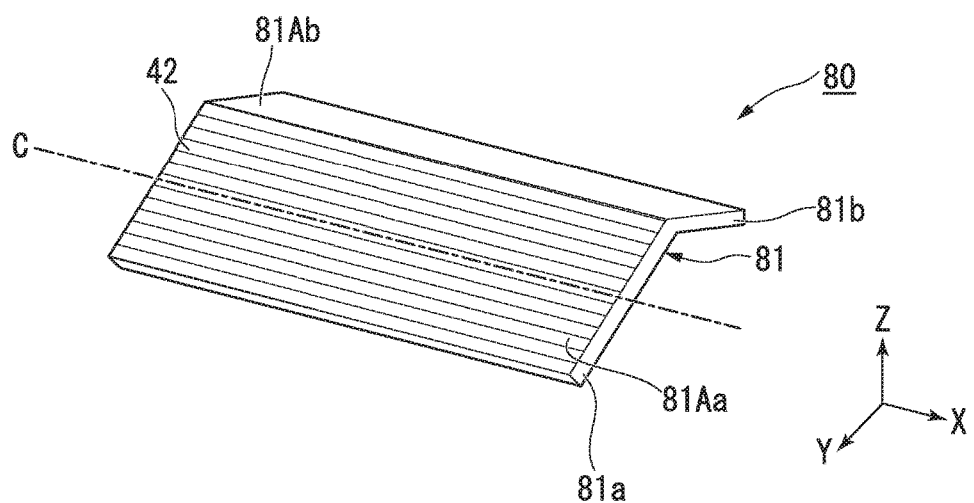
FIG. 17 is a schematic perspective view of a structure of a daylighting slat in accordance with a fifth embodiment.

FIG. 17 is a schematic perspective view of a structure of a daylighting slat in accordance with the fifth embodiment. Referring to FIG. 17, a daylighting slat 80 in accordance with the present embodiment includes a base material 81 bent along a straight line that is parallel to the lengthwise direction of the base material 81 and onset from the centerline C. The daylighting sections 42 are disposed in one of regions divided by the centerline C that is larger in area (first region 81Aa). The length of a first portion 81a on which the first region 81Aa is designated is therefore greater than the length of a second portion 81 b on which a second region 81Ab is designated.

Figure 18A:
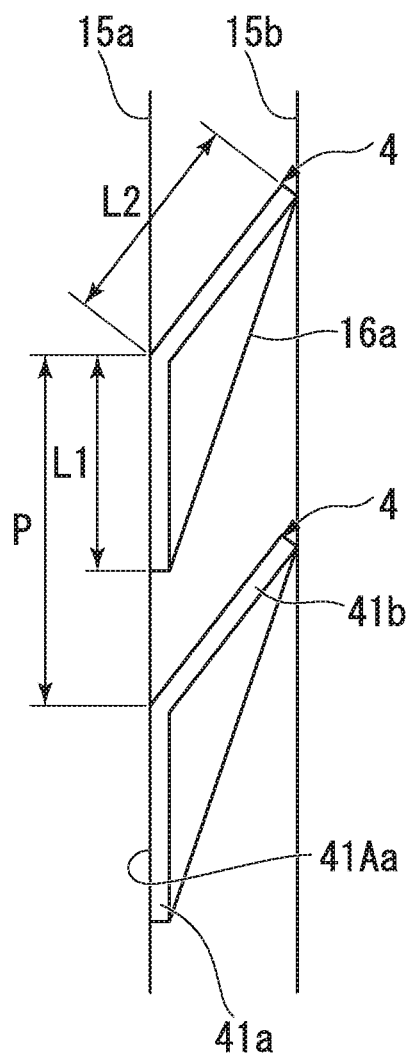
FIG. 18A is a side view of a daylighting device incorporating daylighting slats in accordance with a first embodiment in a fully closed state.
Figure 18B:
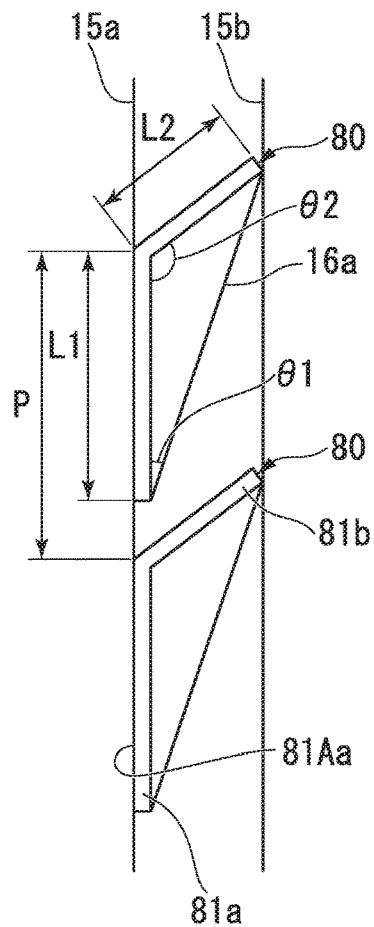
FIG. 18B is a side view of a daylighting device incorporating daylighting slats in accordance with the fifth embodiment in a fully closed state.

FIG. 18A is a side view of a daylighting device incorporating daylighting slats in accordance with the first embodiment in a fully closed state. FIG. 18B is a side view of a daylighting device incorporating daylighting slats in accordance with the fifth embodiment in a fully closed state. Referring to FIG. 18A, in the daylighting slats 4 in accordance with the first embodiment, the length L1 of the first portion 41a on which the first region 41Aa is designated is shorter than the slat pitch P between fully closed adjacent slats. There is therefore some gap remaining between the adjacent daylighting slats 4 even when the daylighting slats 4 are fully closed. In contrast, referring to FIG. 18B, in the daylighting slats 80 in accordance with the fifth embodiment, the first portions 81a are arranged closely between the adjacent daylighting slats 80. This structure thus reduces gaps in size between the adjacent daylighting slats 4 when the daylighting device is fully closed, thereby enhancing daylighting properties. Alternatively, the gaps can be reduced in size by arranging the daylighting slats 4 in accordance with the first embodiment more closely. This structure however requires additional daylighting slats 4.

Assume, for example, that the angle θ1 between the first portion 81a and the straight line connecting both edges of the daylighting slat 80 is equal to 30° and also that the angle θ2 between the first portion 81a and a second portion 81b is equal to 130°. Under these conditions, the slat pitch P is related to the length L1 of the first portion 41a by the equation: L1/P≈0.94. Therefore, the daylighting area ratio is equal to 94%, which verifies that enhanced daylighting properties have been achieved.

The length L2 of the second portion 81b is shorter than the length L1 of the first portion 81a. The structure therefore better prevents the light exiting the daylighting slat 80 from re-entering the second portion 81b. More specifically, the structure prevents part of the light emitted in the direction of the ceiling 1001 from being reflected by the second portion 81b of the daylighting slat 80 in the direction of the floor 1002.

Sixth Embodiment

Next will be described a structure of daylighting slats in accordance with a sixth embodiment of the present invention.

The daylighting slat of the present embodiment described below has substantially the same basic structure as that of the first embodiment and differs in that at least a part of the second portion of the base material has light-absorbing properties. The following description will therefore focus on such a daylighting slat, skipping description of common features. In the drawings referred to in the following description, members that are the same as those in FIGS. 1 to 13C are denoted by the same reference signs or numerals.

Figure 19A:
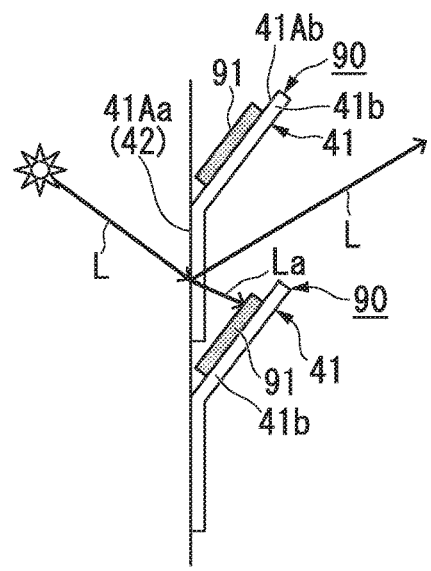
FIG. 19A is a first side view of a daylighting device incorporating daylighting slats in accordance with a sixth embodiment in a fully closed state.
Figure 19B:
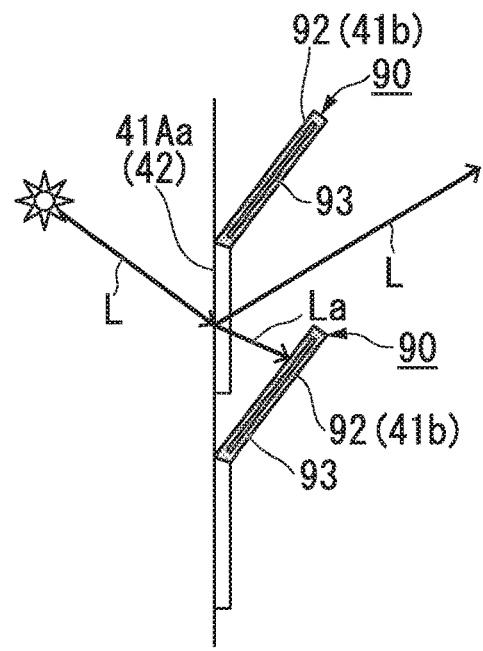
FIG. 19B is a second side view of the daylighting device incorporating the daylighting slats in accordance with the sixth embodiment in a fully closed state.
Figure 19C:
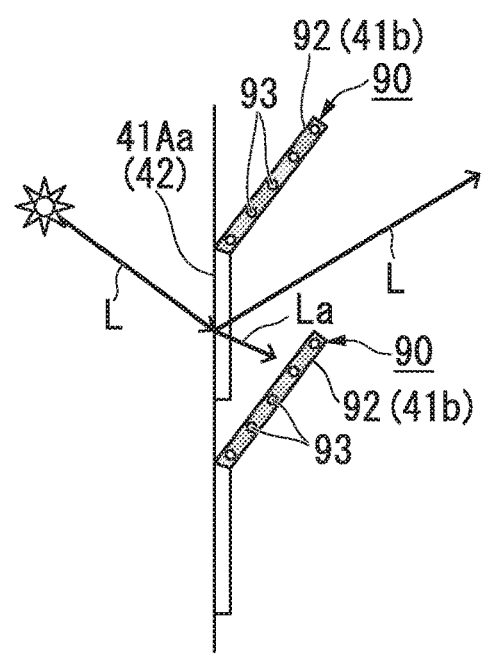
FIG. 19C is a third side view of the daylighting device incorporating the daylighting slats in accordance with the sixth embodiment in a fully closed state.
Figure 19D:
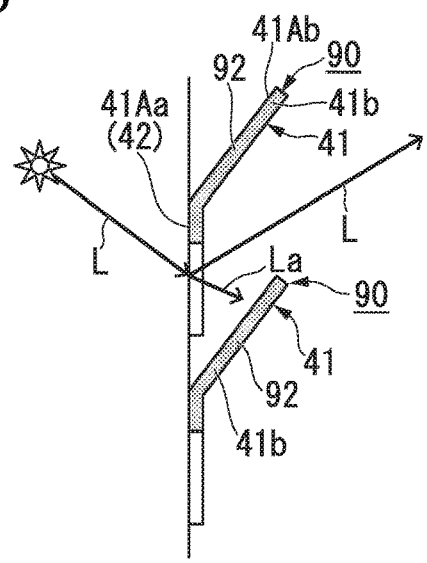
FIG. 19D is a fourth side view of the daylighting device incorporating the daylighting slats in accordance with the sixth embodiment in a fully closed state.

FIGS. 19A to 19D are side views of a daylighting device incorporating daylighting slats in accordance with the sixth embodiment in a fully closed state. 19A to 19D show major parts of the daylighting slats in a scaled-up manner. FIG. 19A shows a light-absorbing portion 91 on one of faces of a second portion 41. FIGS. 19B and 19C show the second portion 41b itself being composed of a light-absorbing member 92. In a daylighting slat 90 in accordance with the sixth embodiment, at least a part of the second portion 41b of the base material 41 has light-absorbing properties in this manner. The whole second portion 41b may have light-absorbing properties. Alternatively, as shown in FIG. 19D, a part of the first portion 41a may have light-absorbing properties. It is useful to impart light-absorbing properties as far as to the first portion because particularly the light incident to the angled part of the base material or the vicinity thereof could in some cases enter indoors directly without undergoing daylighting. Light-absorbing properties may be imparted either by providing the light-absorbing portion 91 on one of faces of the second portion 41b or using the second portion 41b having light-absorbing properties.

The light-absorbing portion 91 in FIG. 19A may be provided by disposing a light-absorbing member (e.g., colored tape) on the second region 41Ab or by coloring the surface of the second region 41Ab. Although coloring the surface black is most preferable for good light-absorbing properties, various other colors are also acceptable. The portion 91 may appear black as a combined result of the color of the daylighting slat 90 itself and the coloring. The second portion 41b may be colored to render the second portion 41b light-absorbing itself.

The light-absorbing member 92 in FIGS. 19B to 19D may be fabricated from a colored resin or other like material. The light-absorbing member 92 preferably contains a core member 93 or core members 93 therein as shown in FIGS. 19B and 19C. The inclusion of the core member(s) 93 increases the rigidity of the daylighting slat 90. The core member 93 may have either a platelike shape as shown in FIG. 19B or a stick-like shape as shown in FIG. 19C. Any other structure may be used where appropriate as long as the structure increases the rigidity of the light-absorbing member 92. For example, the core member 93 may have a net-like structure and be embedded inside the light-absorbing member 92. The light-absorbing member 92 containing the core member 93 therein can be manufactured by, for example, publicly known insert molding.

The outdoor light incident to these daylighting slats 90 is guided in the direction of the ceiling by the daylighting sections 42 in the first region 41Aa as shown in FIGS. 19A to 19C. In contrast, part of the light incident to the first region 41Aa passes through the first region 41Aa (indicated by arrow La). If there is provided no light-absorbing portion 91, this light will travel toward the glare area G (see FIG. 5) and can therefore cause the occupants Ma and Mb of the room 1006 to experience glare. In contrast, the daylighting slat 90 in accordance with the sixth embodiment has the light-absorbing portion 91. Therefore, the light La transmitted through the first region 41Aa of each daylighting slat 90 is absorbed by the light-absorbing portion 91 in the second region 41Ab of the adjoining daylighting slat 90. The structure therefore reduces light traveling toward the glare area G, and the occupants Ma and Mb of the room 1006 consequently experience glare less often.

Figure 20A:
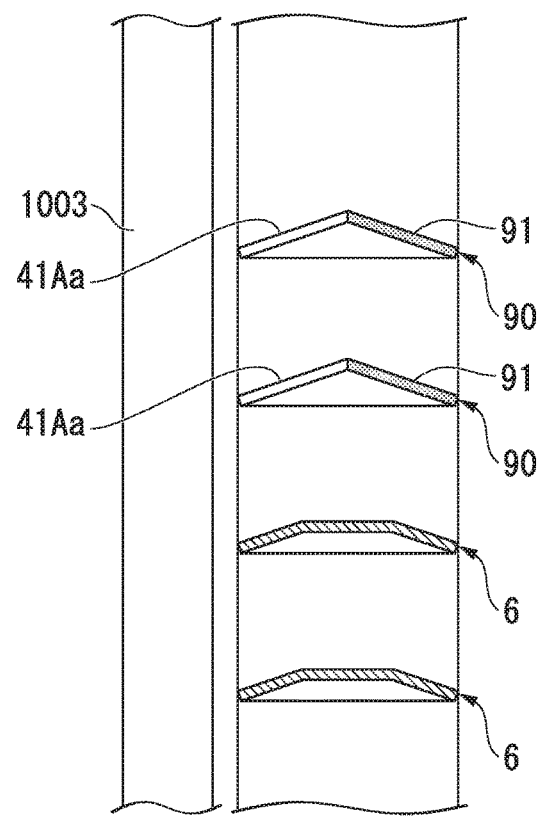
FIG. 20A is a side view of a daylighting device incorporating the daylighting slats in accordance with the sixth embodiment in a fully open state.
Figure 20B:
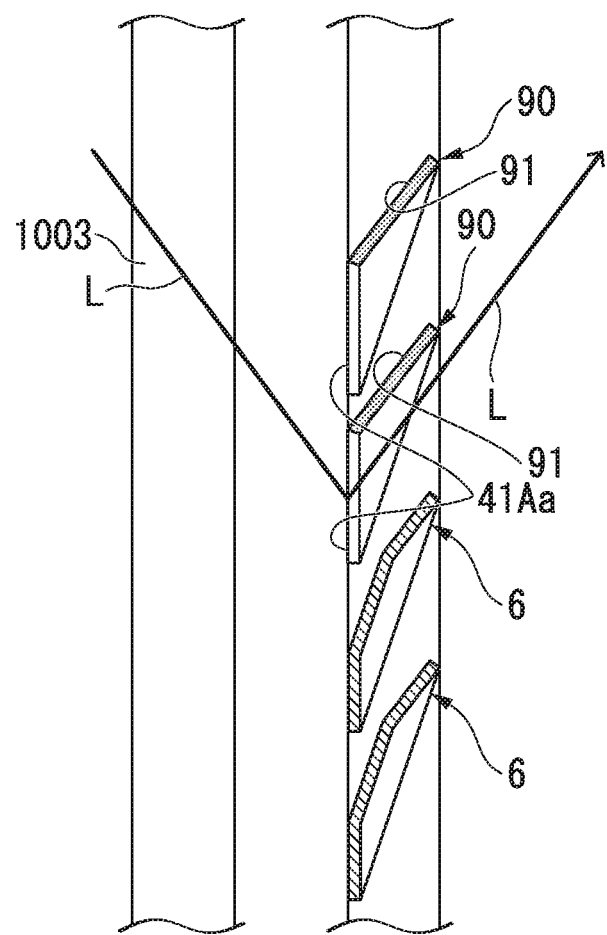
FIG. 20B is a side view of the daylighting device incorporating the daylighting slats in accordance with the sixth embodiment in a daylighting state.
Figure 20C:
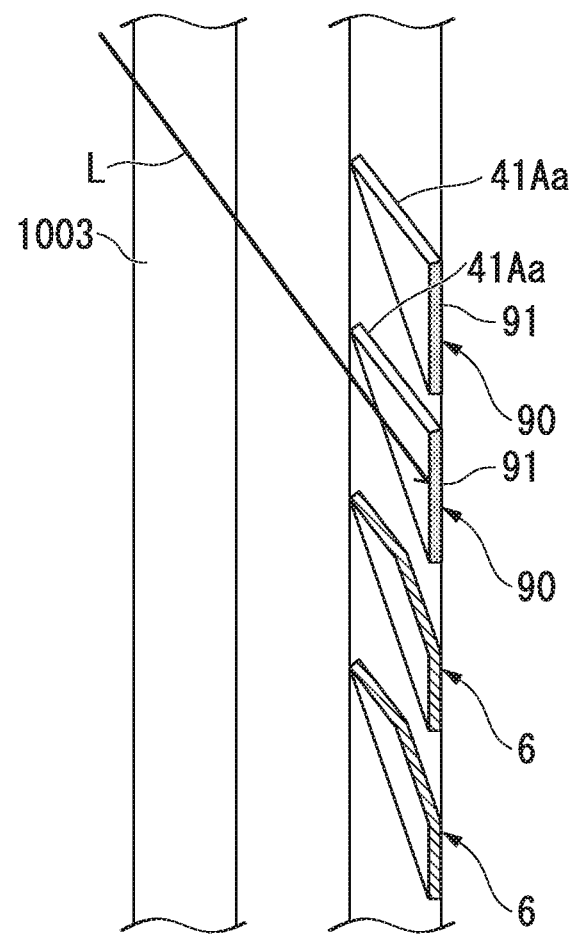
FIG. 20C is a side view of the daylighting device incorporating the daylighting slats in accordance with the sixth embodiment in a dimming state.

The provision of the tight-absorbing portion 91 across the entire surface of the second region 41Ab enables switching between a daylighting state and a dimming state. FIG. 20A is a side view of a daylighting device incorporating the daylighting slats in accordance with the sixth embodiment in a fully open state. FIG. 20B is a side view of the daylighting device incorporating the daylighting slats in accordance with the sixth embodiment in a daylighting state. FIG. 20C is a side view of the daylighting device incorporating the daylighting slats in accordance with the sixth embodiment in a dimming state.

Starting from the fully open state of the daylighting device shown in FIG. 20A, the daylighting slat 80 is pivoted (see FIG. 20B) so that the first region 41Aa in which the daylighting sections 42 are disposed stands upright. The daylighting sections 42 in the first region 41Aa that is now standing upright refract the light coming through the window pane 1003 in the direction of the ceiling 1006.

In contrast, in FIG. 20C, the daylighting slats 80 are pivoted in an opposite direction from the direction in which the daylighting slats 80 are pivoted in FIG. 20B. Therefore, the second region 41Ab in which the light-absorbing portion 91 is disposed stands upright. The light-absorbing portion 91 blocks the light coming through the window pane 1003. If there are gaps between the adjacent daylighting slats 80, outdoor light may be partially allowed indoors, but its intensity is reduced.

The daylighting slat 80 in accordance with the sixth embodiment has the light-absorbing portion 91. This portion 91 may be light-reflecting instead of being light-absorbing. If the second portion 41b itself is to be light-reflecting, the second portion 41b may be a mirror or like reflective plate. In this arrangement, the light coining through the window pane 1003 is reflected by the light-reflecting portion. This reflection causes the light La transmitted through the first region 41Aa of the daylighting slat to travel in the direction of the ceiling 1006.

Seventh Embodiment

Next will be described a structure of daylighting slats in accordance with a seventh embodiment of the present invention.

The daylighting slat of the present embodiment described below has substantially the same basic structure as that of the first embodiment and differs in that the base material is notched where it comes into contact with ladder cords. The following description therefore focus on such a daylighting slat, skipping description of common features. In the drawings referred to in the following description, members that are the same as those in FIGS. 1 to 13C are denoted by the same reference signs or numerals.

Figure 21:
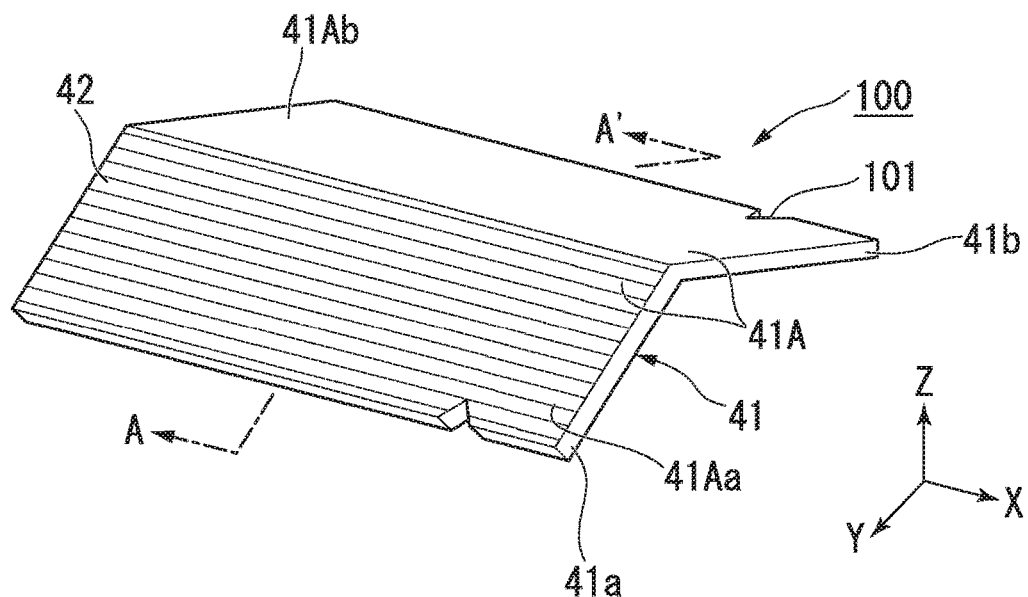
FIG. 21 is a schematic perspective view of a daylighting slat in accordance with a seventh embodiment.

FIG. 21 is a schematic perspective view of a daylighting slat in accordance with the seventh embodiment, A daylighting slat 100 in accordance with the seventh embodiment has notches 101 in parts of portions thereof where the daylighting slat 100 comes into contact with a ladder cord 12 for the base material 41 (see FIGS. 4A and 4B). FIG. 21 shows the notches 101 in both the first portion 41a and the second portion 41b of the base material 41. Alternatively, the daylighting slat 100 may have a notch 101 only in either one of the first and second portions 41a and 41b.

Figure 22A:
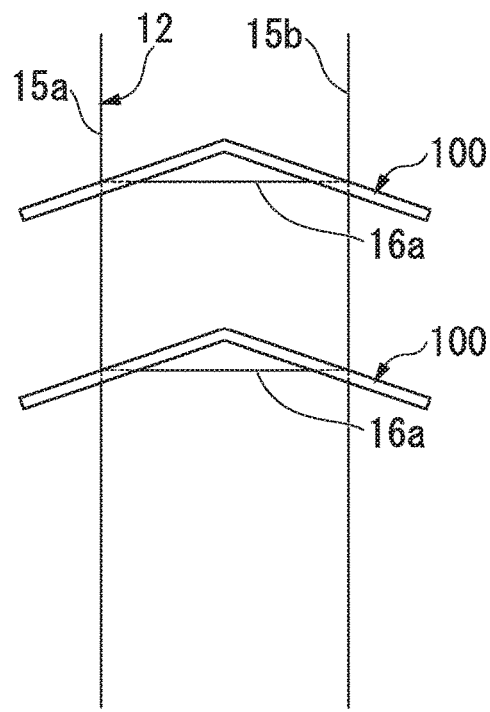
FIG. 22A is a side view of a daylighting device incorporating daylighting slats in accordance with the seventh embodiment in a fully open state.
Figure 22B:
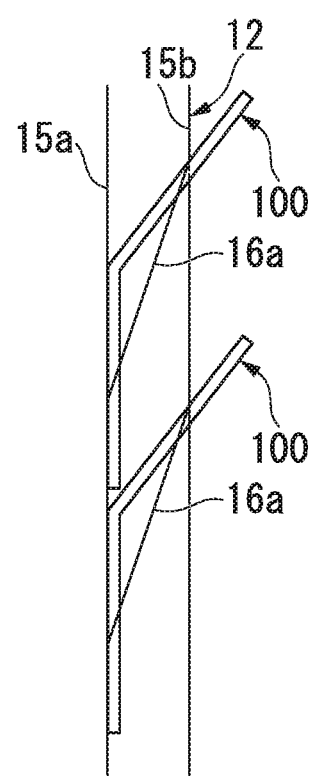
FIG. 22B is a side view of the daylighting device incorporating the daylighting slats in accordance with the seventh embodiment in a fully closed state.

FIG. 22A is a side view of a daylighting device incorporating daylighting slats in accordance with the seventh embodiment in a fully open state. FIG. 22B is a side view of the daylighting device incorporating the daylighting slats in accordance with the seventh embodiment in a fully closed state. The daylighting slat 100 in accordance with the seventh embodiment has notches 101 in portions thereof where the daylighting slat 100 comes into contact with a ladder cord 12. Therefore, as shown in FIG. 22A, in the fully open state, the daylighting slat 100 extends in a side view thereof beyond a region between the vertical cords 15a and 15b in the set of ladder cords 12. Therefore, the width of the daylighting slat 100 may be specified freely regardless of the distance by which the vertical cords 15a and 15b are separated. Additionally; since the ladder cords 12 run through the notches 101, the daylighting slat 100 is prevented from being displaced in the left/right directions.

Referring to FIG. 22B, in the fully closed state, the daylighting slat 100 extends beyond the horizontal cord 16a in the set of ladder cords 12. The gaps formed between the adjacent daylighting slats 100 in the daylighting slats with no notches 101 (e.g., see FIG. 18A) can therefore be reduced by using the daylighting slats 100 in accordance with the seventh embodiment. In other words, the daylighting slats 100 have an increased daylighting area ratio in the fully closed state, thereby achieving enhanced daylighting properties.

Eighth Embodiment

Next will be described a structure of daylighting slats in accordance with an eighth embodiment of the present invention.

The daylighting slat of the present embodiment described below has substantially the same basic structure as that of the first embodiment and differs in the shape of the base material. The following description will therefore focus on such a daylighting slat, skipping description of common features. In the drawings referred to in the following description, members that are the same as those in FIGS. 1 to 13C are denoted by the same reference signs or numerals.

Figure 23:
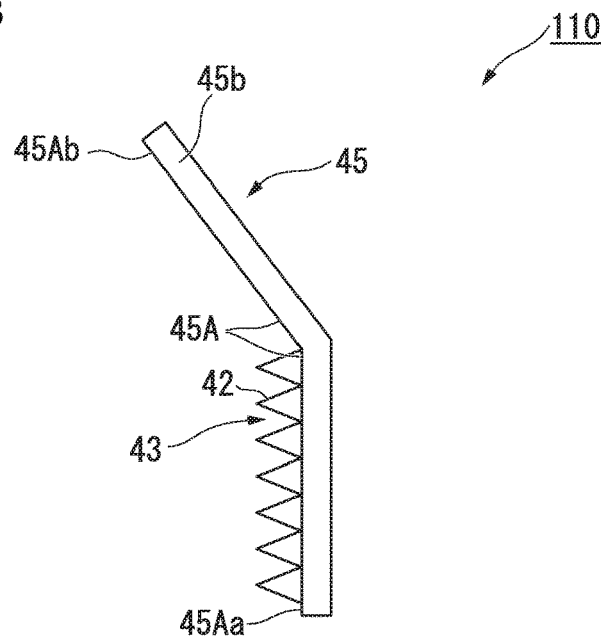
FIG. 23 is a cross-sectional view of a daylighting slat in accordance with an eighth embodiment.

FIG. 23 is a cross-sectional view of a daylighting slat in accordance with the eighth embodiment. A daylighting slat 110 in accordance with the eighth embodiment includes the base material 45 shown in FIG. 10A. The daylighting sections 42 are disposed in a first region 45 of the base material 45.

Figure 24A:
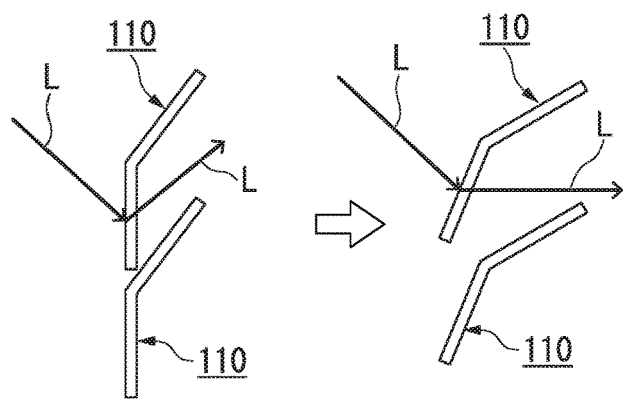
FIG. 24A is a schematic view illustrating a function of the daylighting slats in accordance with the first embodiment.
Figure 24B:
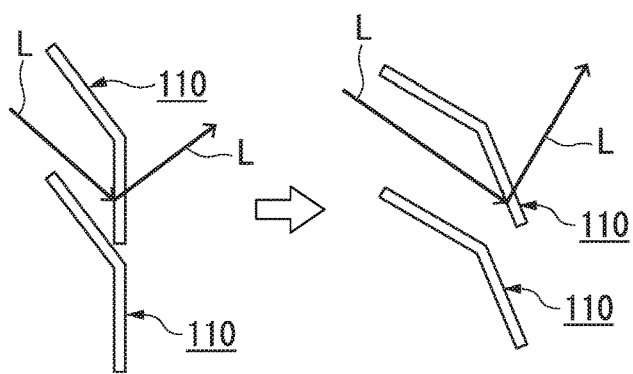
FIG. 24B is a schematic view illustrating a function of daylighting slats in accordance with the eighth embodiment.

FIG. 24A is a schematic view illustrating a function of the daylighting slats in accordance with the first embodiment. FIG. 24B is a schematic view illustrating a function of the daylighting slats in accordance with the eighth embodiment. FIG, 24A shows a side view of the daylighting device in a fully closed state on the left and a side view of the daylighting device after a tilting operation on the right.

Referring to FIG. 24A, the daylighting slat 4 in accordance with the first embodiment tilts as a result of a tilting operation of pivoting the daylighting slat 4 in the fully closed state in the daylighting-device-opening direction. As a result of the tilting of the daylighting slat 4, the light traveling in the direction of the ceiling 1001 in FIG. 5 changes direction and travels in the direction of the floor 1002, which means that the light travels toward the glare area G during the tilting operation.

In contrast, the daylighting slat in accordance with the eighth embodiment restrains light from traveling toward the glare area also upon the tilting operation. FIG. 24B shows a side view of the daylighting device in the fully closed state on the left and a side view of the daylighting device after a tilting operation on the right. Referring to FIG. 24B, the daylighting slat 110 in accordance with the eighth embodiment tilts as a result of a tilting operation of pivoting the daylighting slat 110 in the fully closed state in the daylighting-device-opening direction. The daylighting slat 110 differs from the daylighting slat 4 in accordance with the first embodiment in that the daylighting slat 110 includes the daylighting sections 42. As a result of the tilting of the daylighting slat 110, the light traveling in the direction of the ceiling 1001 in FIG. 5 changes direction and travels in the direction of a part of the ceiling 1001 of the room 1006 that is closer to a window side 1003, which means that light is restrained from traveling toward the glare area G also upon the tilting operation.

Ninth Embodiment

Next will be described a structure of a daylighting device in accordance with a ninth embodiment.

The daylighting device of the present embodiment described below has substantially the same basic structure as those of the first to eighth embodiments and differs in that all the daylighting slats in each daylighting device of the first to eighth embodiments are of a single type, whereas in the ninth embodiment there is provided a mixture of daylighting slats of different optical designs. The following description will therefore focus on this feature, skipping description of common features. In the drawings referred to in the following description, members that are the same as those in FIGS. 1 to 13C are denoted by the same reference signs or numerals.

Figure 25:
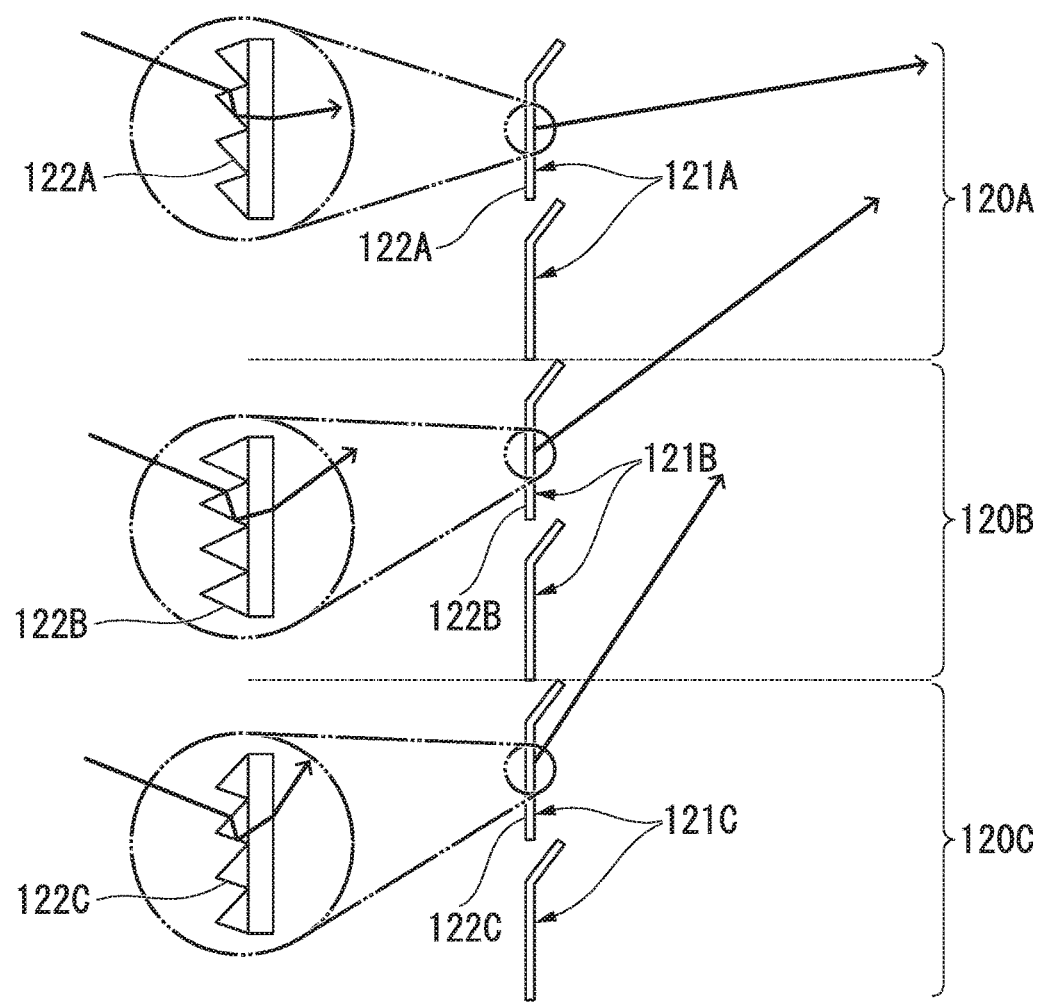
FIG. 25 is a schematic diagram showing cross-sections of a daylighting device in accordance with a ninth embodiment.

FIG. 25 is a schematic diagram showing cross-sections of a daylighting device in accordance with the ninth embodiment. A daylighting device 120 in FIG. 25 includes three vertically separated regions, an upper region 120A, a middle region 120B, and a lower region 120C. Daylighting slats 121A delineating the upper region 120A, daylighting slats 121B delineating the middle region 120B, and daylighting slats 121C delineating the lower region 120C are of mutually different optical designs. Specifically, daylighting sections 122A on the daylighting slats 121A, daylighting sections 122B on the daylighting slats 121A, and daylighting sections 122C on the daylighting slats 121C have mutually different shapes.

Referring to FIG. 25, the light entering the daylighting device 120 from the outside changes direction in the daylighting sections 122A to 122C. Accordingly, the light entering the upper region 120A, the middle region 120B, and the lower region 120C exits in different directions.

FIG. 25 shows an exemplary design where the light incident to the lower region 120C is emitted roughly over the window 1003, the light incident to the upper region 120A is emitted at the back wall 1005, and the light incident to the middle region 120B is emitted in an intermediate direction (see FIG. 5). Changing the traveling direction of light exiting the daylighting device 120 from one region to another in this manner creates uniform illuminance across the entire room.

The upper region 120A, the middle region 120B, and the lower region 120C may have any area ratio. To change the traveling direction of exiting light from roughly over the window 1003 to at the back wall 1005 as moving from the lower region 120C to the upper region 120A as described above, the area of each region is specified as in the following.

The distance from the daylighting device 120 to the ceiling 1001 traveled by the tight transmitted through the tower region 120C is shorter than the distance from the daylighting device 120 to the ceiling 1001 traveled by the tight transmitted through the upper region 120A. The longer the distance traveled by light, the more likely the light will be scattered by dust and the like. Therefore, the amount of light emitted from the upper region 210A is preferably larger than the amount of light emitted from the lower region 210C for uniform illuminance across the entire room. Therefore, if each region is to be specified to guide exiting light in the direction indicated in FIG. 25, it is preferable that the area ratio increase in the order of the upper region 120A, the middle region 120B, and the lower region 120C.

FIG. 25 shows three regions, which is not the only feasible structure. The daylighting device 120 may be divided into three or more regions or into two regions. The number of regions may be altered as appropriate. The traveling direction of light transmitted through each region may also be freely changed. The traveling direction of light may be changed by modifying the shape of the daylighting sections. A shading area may also be provided as in the daylighting device 1 described in the first embodiment. The layout of the daylighting area and the shading area may also be determined appropriately.

Preferred embodiments of the present invention have been so far described in reference to the attached drawings. The present invention is by no means limited to the embodiments and examples described above. The person skilled in the art could obviously conceive variations and modifications within the scope of the claims. The variations and modifications are encompassed in the technical scope of the claims. The technical features disclosed in the embodiments may be combined where appropriate. In addition, although the embodiments have primarily described single angled plates as examples, curved slats with curved surfaces may be used instead.

Lighting-modulation System

Figure 26:
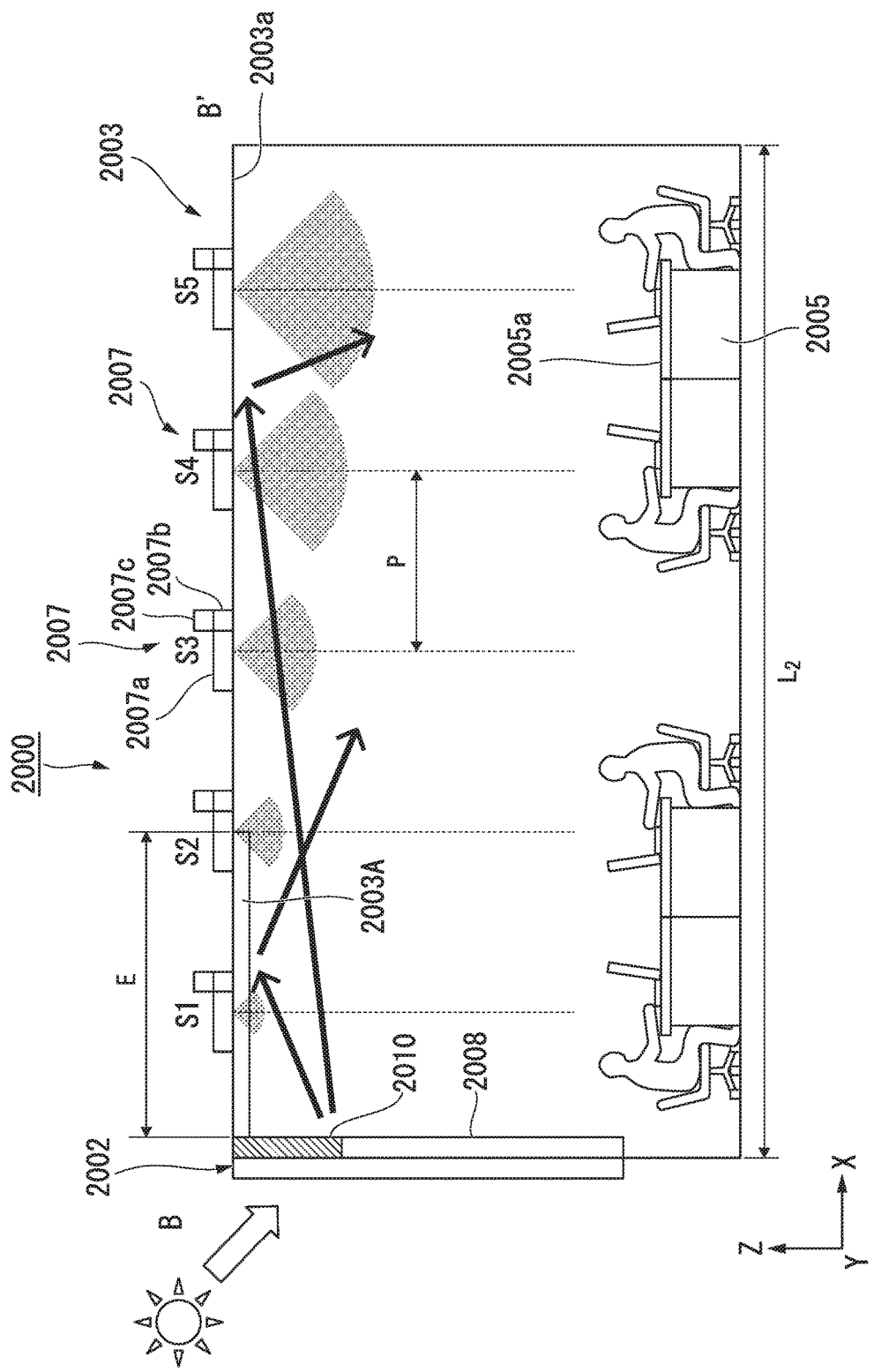
FIG. 26 is a cross-sectional view, taken along line B-B' in FIG. 27, of a room model 2000 in which a daylighting device and a lighting-modulation system are installed.
Figure 27:
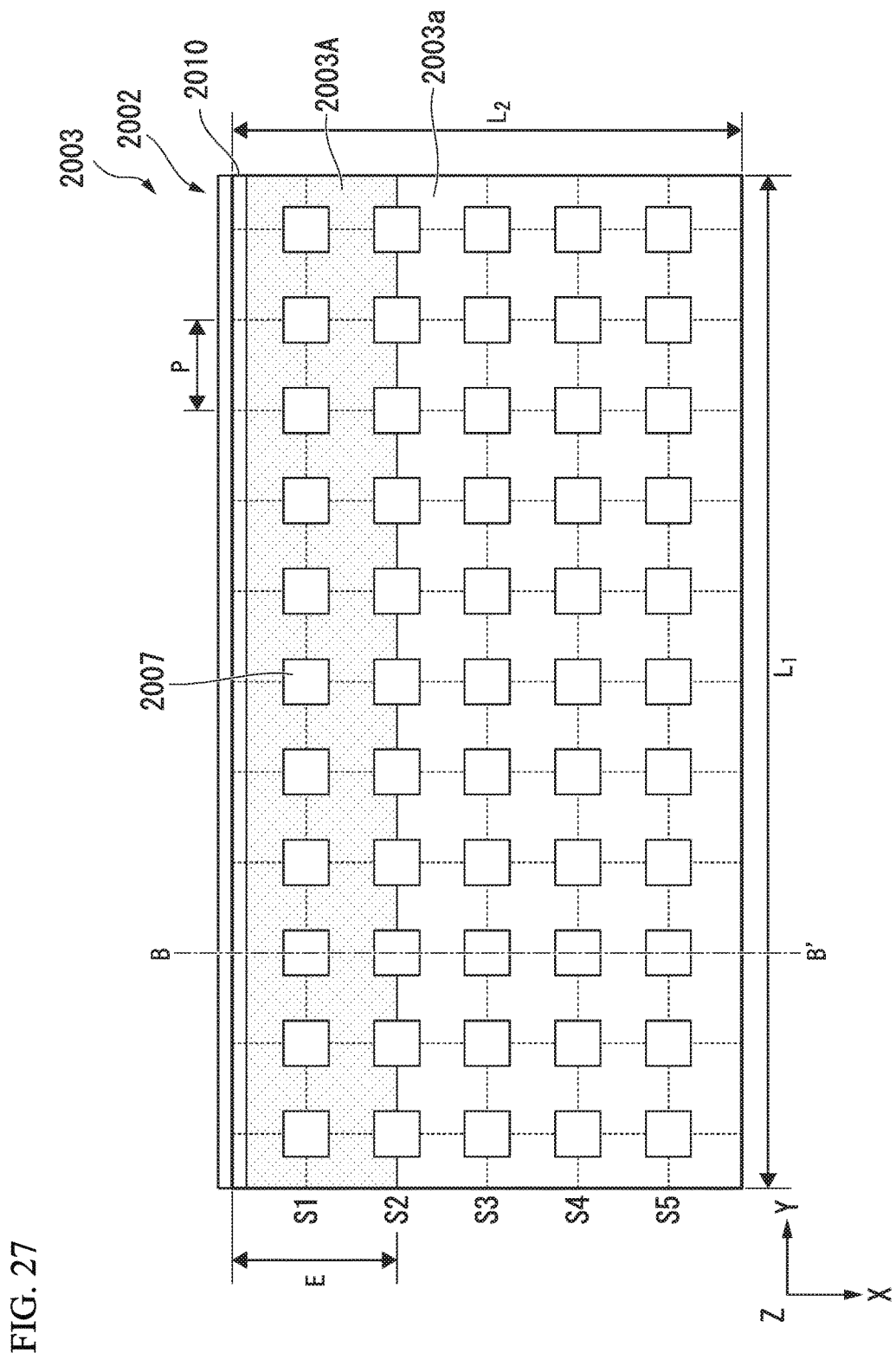
FIG. 27 is a plan view of a ceiling of the room model.
Figure 28:
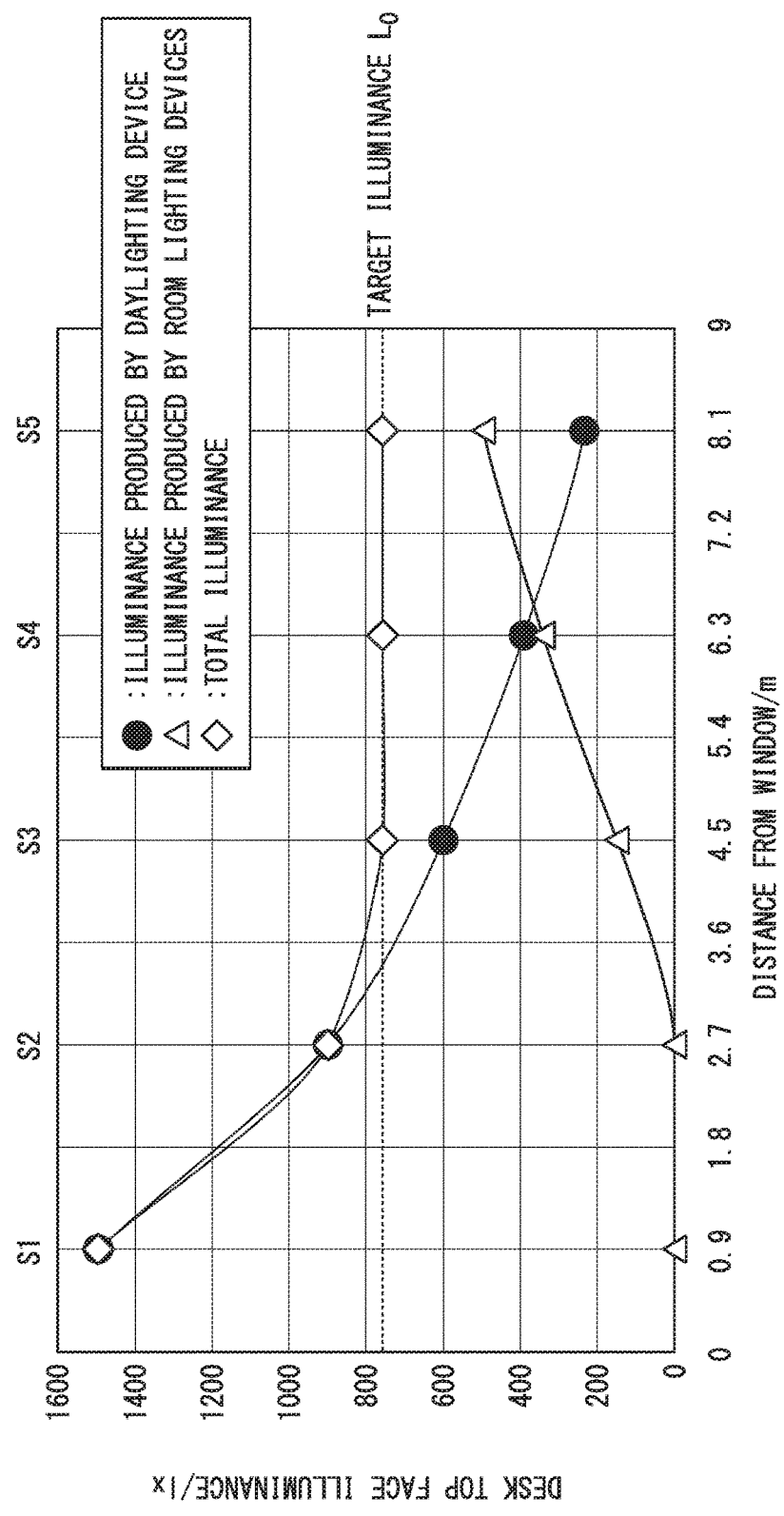
FIG. 28 is a graph representing a relationship between the illuminance produced by daylighting light (natural light) guided into the interior (guided indoors) by a daylighting device and the illuminance produced by room lighting devices (lighting-modulation system).

FIG. 26 is a cross-sectional view, taken along line B-B' in FIG. 27, of a room model 2000 in which a daylighting device and a lighting-modulation system are inserted. FIG. 28 is a plan view of a ceiling of the room model 2000.

In the room model 2000, a room 2003 into which outdoor light is guided has a ceiling 2003a constituted partly by a ceiling material that may have high light-reflecting properties. Referring to FIGS. 26 and 27, the ceiling 2003a of the room 2003 is provided with a tight-reflecting ceiling material 2003A as the ceiling material having such light-reflecting properties. The light-reflecting ceiling material 2003A is for facilitating the guiding of outdoor light from a daylighting device 2010 installed over a window 2002 deep into the interior. The light-reflecting ceiling material 2003A is disposed on a part of the ceiling 2003a that is close to the window, specifically, on a predetermined part E of the ceiling 2003a (approximately up to 3 meters from the window 2002).

The light-reflecting ceiling material 2003A, as described above, serves to efficiently direct deep into the interior the outdoor light guided indoors through the window 2002 on which the daylighting device 2010 (any of the daylighting devices of the abovementioned embodiments) is installed. The outdoor light guided in the direction of the indoor ceiling 2003a by the daylighting device 2010 is reflected by the light-reflecting ceiling material 2003A, hence changing direction and illuminating a desk top face 2005a of a desk 2005 located deep in the interior. Thus, the light-reflecting ceiling material 2003A has an effect of brightly lighting up the desk top face 2005a.

The light-reflecting ceiling material 2003A may be either diffuse reflective or specular reflective. Preferably, the light-reflecting ceiling material 2003A has a suitable mix of these properties to achieve both the effect of brightly lighting up the desk top face 2005a of the desk 2005 located deep in the interior and the effect of mitigating glare which is uncomfortable to occupants.

Much of the light guided indoors by the daylighting device 2010 travels in the direction of the part of the ceiling that is close to the window 2002. Still, the part of the interior that is close to the window 2002 often has sufficient lighting. Therefore, the light that strikes the ceiling near the window (part E) can be partially diverted to a deep part of the interior where lighting is poor compared to the part near the window, by additionally using the light-reflecting ceiling material 2003A described here.

The light-reflecting ceiling material 2003A may be manufactured, for example, by embossing irregularities each of approximately several tens of micrometers on an aluminum or similar metal plate or by vapor-depositing a thin film of aluminum or a similar metal on the surface of a resin substrate having similar irregularities formed thereon. Alternatively, the embossed irregularities may be formed from a curved surface with a higher cycle.

Furthermore, the embossed shape formed on the light-reflecting ceiling material 2003A may be changed as appropriate to control light distribution properties thereof and hence resultant indoor light distribution. For example, if stripes extending deep into the interior are embossed, the light reflected by the light-reflecting ceiling material 2003A is spread to the left and right of the window 2002 (in the directions that intersect the length of the irregularities). When the window 2002 of the room 2003 is limited in size or orientation, these properties of the light-reflecting ceiling material 2003A can be exploited to diffuse light in horizontal directions and at the same time to reflect the light deep into the room.

The daylighting device 2010 is used as a part of a lighting-modulation system for the room 2003. The lighting-modulation system includes, for example, the daylighting device 2010, a plurality of room lighting devices 2007, an insolation adjustment device 2008 installed over the window, a control system for these devices, the light-reflecting ceiling material 2003A installed on the ceiling 2003a, and other structural members of the whole room.

The window 2002 of the room 2003 has the daylighting device 2010 installed over an upper portion thereof and the insolation adjustment device 2008 installed over a lower portion thereof. In this example, the insolation adjustment device 2008 is a window shade, which is by no means intended to limit the scope of the invention.

In the room 2003, the room lighting devices 2007 are arranged in a lattice in the left/right direction (Y direction) of the window 2002 and in the depth direction (X direction) of the room. These room lighting devices 2007, in combination with the daylighting device 2010, constitute an illumination system for the whole room 2003.

Referring to FIGS. 26 and 27 illustrating the office ceiling 2003a, for example, the window 2002 has a length $L_1$ of 18 meters in the left/right direction (Y direction), and the room 2003 has a length $L_2$ (depth) of 9 meters in the X direction. The room lighting devices 2007 in this example are arranged in a lattice in the length (Y direction) and depth (X direction) of the ceiling 2003a at intervals P each of 1.8 meters. More specifically, a total of 50 room lighting devices 2007 is arranged in a lattice of 10 rows (Y direction) and 5 columns (X direction).

Each room lighting device 2007 includes an interior lighting fixture 2007a, a brightness detection unit 2007b, and a control unit 2007c. The brightness detection unit 2007b and the control unit 2007c are integrated into the interior lighting fixture 2007a to form a single structure.

Each room lighting device 2007 may include two or more interior lighting fixtures 2007a and two or more brightness detection units 2007b, with one brightness detection unit 2007b for each interior lighting fixture 2007a. The brightness detection unit 2007b receives a reflection off the face illuminated by the interior lighting fixture 2007a to detect illuminance on that face. In this example, the brightness detection unit 200b detects illuminance on the desk top face 2005a of the desk 2005 located indoors.

The control units 2007 c, each for a different one of the room lighting devices 2007, are connected to each other. In each room lighting device 2007, the control unit 2007 c, connected to the other control units 2007 c, performs feedback control to adjust the light output of an LED lamp in the interior lighting fixture 2007 a so that the illuminance on the desk top face 2005 a detected by the brightness detection unit 2007 b is equal to a predetermined target illuminance $L_0$ (e.g., an average illuminance: 750 1x).

FIG. 28 is a graph representing a relationship between the illuminance produced by the daylighting light (natural light) guided into the interior by the daylighting device and the illuminance produced by the room lighting devices (lighting-modulation system). In FIG. 28, the vertical axis indicates illuminance (1x) on the desk top face, and the horizontal axis indicates distance (meters) from the window. The broken line in the figure indicates the target indoor illuminance. Each black circle denotes an illuminance produced by the daylighting device, each white triangle denotes an illuminance produced by the room lighting devices, and each white diamond denotes a total illuminance.

Referring to FIG. 28, the desk top face illuminance attributable to the daylighting light guided by the daylighting device 2010 is highest at the window and decreases with increasing distance from the window. This illuminance distribution in the depth direction of the room is caused during daytime by natural daylight coming through a window in the room in which the daylighting device 2010 is installed. Accordingly, the daylighting device 2010 is used in combination with the room lighting devices 2007 which enhance the indoor illuminance distribution. Each room lighting device 2007, disposed on the indoor ceiling, detects an average illuminance below that device by means of the brightness detection unit 2007 b and lights up in a modulated manner so that the desk top face illuminance across the whole room are equal to the predetermined target illuminance $L_0$. Therefore, a column S3, a column S4, and a column S5 light up to produce output that increases with increasing depth into the room (increases in the order of the column S3, the column S4, and the column S5). Consequently, the desk top faces across the whole room are lit up by the sum of the illumination by natural daylight and the illumination by the room lighting devices 2007 at a desk top face illuminance of 750 1x, which is regarded as sufficient for desk work (see, JIS 29110, General Rules of Recommended Lighting Levels, Recommended Illuminance at Offices).

As described above, light can be delivered deep into the interior by using both the daylighting device 2010 and the lighting-modulation system (room lighting devices 2007) together, This can in turn further improve indoor brightness and ensure a sufficient desk top face illuminance for desk work across the whole room, hence realizing a more stable, brightly lit environment independently from the season or the weather.

INDUSTRIAL APPLICABILITY

The present invention, in one aspect thereof, is applicable to daylighting devices that include slats with increased rigidity and also that preserve conventional levels of lightweightness and ease of retraction of the slats and to daylighting slats that are suitably used in such daylighting devices.

REFERENCE SIGNS LIST 1, 121: Daylighting Device
2: Slat
3: Support Mechanism
4, 30, 50, 60, 70, 80, 90, 100, 110, 121A, 121B, 121C: Daylighting Slat
41, 45, 46, 47, 48, 49, 81: Base Material
41A: First Face
41Aa, 45Aa, 46Aa, 47Aa, 48Aa, 49Aa, 81Aa: First Region
42, 42A, 42B, 42C, 61, 62, 122A, 122B, 122C: Daylighting Section
43: Gap Portion
51: Support Member
5: Daylighting Area
6: Shading Slat
7: Shading Area
71: Diffusion Film (Diffusion Layer)
91: Light-blocking Portion
92: Light-absorbing Member
93: Core Member
101: Notch
L: Light

The invention claimed is:

1. A daylighting slat comprising a daylighting plane extending in one direction, the daylighting plane comprising:
a base material that is transparent, the base material including a first region and a second region, the first region having an elongate and plate-like shape, the base material having a curved or angled shape in a cross-section taken perpendicular to a lengthwise direction of the daylighting plate, the first region adjoining the second region across a straight line parallel to the lengthwise direction;
a plurality of first daylighting sections that are transparent, the plurality of first daylighting sections being disposed on a first face of the first region, the plurality of first daylighting sections being not disposed on the second region; and
gap portions between the plurality of first daylighting sections,
wherein each of the plurality of first daylighting sections has a side face in a contact with one of the gap portions, a part of the side face serving as a reflection face where light incident to the plurality of first daylighting sections is reflected.

2. The daylighting slat according to claim 1, wherein the plurality of first daylighting sections are disposed on the first face via a film.

3. The daylighting slat according to claim 1, the daylighting slat further comprising:
a support member configured to support the daylighting plate.

4. The daylighting slat according to claim 1, the daylighting slat further comprising:
a plurality of second daylighting sections, wherein
the plurality of second daylighting sections are disposed on the second region, and
a first daylighting function of the plurality of first daylighting sections is different from a second daylighting function of the plurality of second daylighting sections.

5. The daylighting slat according to claim 4, wherein the plurality of first daylighting sections have a different shape from that of the plurality of second daylighting sections, in respective cross-sections taken perpendicular to lengthwise directions thereof.

6. The daylighting slat according to claim 1, the daylighting slat further comprising:
a light-diffusion layer on a second face of the first region.

7. The daylighting slat according to claim 1, wherein the base material is bent along a centerline thereof that is parallel to a lengthwise direction of the base material.

8. The daylighting slat according to claim 1, wherein:
the base material is bent along the straight line and offset from a centerline of the base material; and
a first area of the first region is larger than a second area of the second region.

9. The daylighting slat according to claim 1, wherein the second region is light-absorbing.

10. The daylighting slat according to claim 1, wherein the second region is light-reflecting.

11. A daylighting device comprising:
a plurality of slats; and
a support mechanism configured to connect the plurality of slats so that the plurality of slats have a lengthwise direction thereof in a horizontal direction and also to support the plurality of slats so that the plurality of slats hangs down in a vertical direction,
wherein at least one of the plurality of slats comprises the daylighting slat according to claim 1.

12. The daylighting slat according to claim 11, wherein the support mechanism is configured to support the plurality of slats so that the plurality of slats can move up and down.

13. The daylighting slat according to claim 11, wherein the support mechanism is configured to support the plurality of slats so that the plurality of slats can be tilted in a controlled manner.

14. The daylighting slat according to claim 11, wherein:
at least one of those the plurality of slats which are in a vertically higher portion comprises the daylighting slat; and
at least another one of those the plurality of slats which are in a vertically lower portion comprises a shading slat.

15. The daylighting slat according to claim 14, wherein the daylighting slat has a shape identical to that of the shading slat, in response cross-sections taken perpendicular to the lengthwise directions thereof.

16. The daylighting slat according to claim 11, wherein:
at least two of the plurality of slats each comprises the daylighting slat; and
in at least one of the daylighting slats, the plurality of first daylighting sections have different shapes.

* * * * *